United States Patent [19]

Yoshimura et al.

[11] Patent Number: 4,882,615

[45] Date of Patent: Nov. 21, 1989

[54] VIDEO SIGNAL PROCESSING SYSTEM

[75] Inventors: Katsuji Yoshimura; Tadayoshi Nakayama; Hisashi Ishikawa; Chikara Sato, all of Kanagawa, Japan

[73] Assignee: Canon Kabushiki Kaisha, Tokyo, Japan

[21] Appl. No.: 252,024

[22] Filed: Sep. 28, 1988

Related U.S. Application Data

[63] Continuation of Ser. No. 11,515, Feb. 5, 1987, abandoned.

[30] Foreign Application Priority Data

| Feb. 10, 1986 | [JP] | Japan | 61-025749 |
| Feb. 10, 1986 | [JP] | Japan | 61-025750 |
| Feb. 10, 1986 | [JP] | Japan | 61-025751 |
| Feb. 10, 1986 | [JP] | Japan | 61-025752 |
| Feb. 10, 1986 | [JP] | Japan | 61-025753 |
| Feb. 14, 1986 | [JP] | Japan | 61-028949 |

[51] Int. Cl.$^4$ .............................................. H04N 9/78
[52] U.S. Cl. ................................................... 358/31
[58] Field of Search ........................................... 358/31

[56] References Cited

U.S. PATENT DOCUMENTS

| 4,352,122 | 9/1982 | Reitmeier et al. | 358/13 |
| 4,626,895 | 12/1986 | Reitmeier | 358/31 |
| 4,727,415 | 2/1988 | Nakagawa et al. | 358/31 |

FOREIGN PATENT DOCUMENTS

| 149214 | 7/1985 | European Pat. Off. | 358/31 |
| 129890 | 8/1983 | Japan | 358/31 |
| 129891 | 8/1983 | Japan | 358/31 |
| 62292 | 4/1985 | Japan | 358/31 |
| 139090 | 7/1985 | Japan | 358/31 |
| 18285 | 1/1986 | Japan . | |
| 224589 | 10/1986 | Japan . | |

OTHER PUBLICATIONS

Maxemchuk et al., Separation of NTSC Signals by Minimum Mean Square Error Filters and Adaptive Filters, IEEE Transactions on Communications, Vol. COM-26, No. 5, May, 1978, pp. 583-593.

Primary Examiner—John W. Shepperd
Attorney, Agent, or Firm—Robin, Blecker, Daley & Driscoll

[57] ABSTRACT

The video processing apparatus according to this invention is constructed to receive a composite television signal having frequency-multiplexed luminance and chrominance signals. The composite color television signal is divided into a plurality of picture element signals by sampling it, and the luminance and chrominance signals frequency-multiplexed in each of the plurality of picture element signals are separated. An arbitrary one of the plurality of picture element signals is extracted as a remark picture element. A plurality of picture element signals whose chrominance signal frequency multiplexed therein is of the same phase as that of the chrominance signal frequency multiplexed in said remark picture element signal is extracted as first reference picture element signals. A plurality of picture element signals whose chrominance signal frequency multiplexed therein is in opposite phase to that of the chrominance signal multiplexed in the remark picture element signal is extracted as second reference picture element signals. Plural kinds of computed picture element signals are formed by using the remark element signals and a part of the plurality of second picture element signals. A plurality of correlation state signals are formed by computing the remark picture element signal, a part of the plurality of first reference picture element signals and part of the plurality of second reference picture element signals. A part of the plurality of computed picture element signals is selected on the basis of the plurality of correlation state signals.

18 Claims, 15 Drawing Sheets $\bigotimes$ = Y+C    $\boxtimes$ = Y+$\bar{C}$    C=U+V $\bigcirc$ = Y-C    $\square$ = Y-$\bar{C}$    $\bar{C}$=U-V

FIG.14

| PICTURE ELEMENT BLOCK SELECTED | A5 | B5 | C5 | D5 | E5 | F5 | G5 | G5 | F5 | E5 | A5 | B5 | C5 | D5 | G5 |
|---|---|---|---|---|---|---|---|---|---|---|---|---|---|---|---|
| S6 | O | X | X | X | O | O | X | X | X | X | O | O | O | X | O |
| S7 | X | O | X | X | O | X | O | O | X | O | O | O | X | O | O |
| S8 | X | X | O | X | X | O | O | X | X | X | O | X | O | O | O |
| S9 | X | X | X | O | X | X | X | O | O | O | X | O | O | O | O |

STRENGTH OF CORRELATION TO S3

O : STRONG CORRELATION

VIDEO SIGNAL PROCESSING SYSTEM

This application is a continuation of application Ser. No. 011,515, filed 2/5/87 now abandoned.

BACKGROUND OF THE INVENTION

1. Field of the Invention

This invention relates to video signal processing systems in which a video signal such as the composite color television signal of, for example, NTSC standards, is separated into luminance and chrominance informations.

2. Description of the Related Art

The complete color video signals now in use, a typical example of which is the composite color television signal S of NTSC standards, each have the composite form of luminance information Y and chrominance information C, the latter further in the 90°-apart 2-phase modulated form of the two color difference signals U and V (or I and Q) on a color subcarrier of frequency fsc. It can be written as $S = Y + C = Y + U\sin(2\pi f_{sc} t) + V\cos(2\pi f_{sc} t)$. From the frame frequency $f_F$ (30 Hz), field frequency $f_V$ (60 Hz) and horizontal scanning frequency $f_H$, we have $$fsc = (455/2)f_H = (455/2)(525/2)f_V = (455/2)525f_F$$

For this reason, when the composite color television signal of the NTSC standards is sampled at a frequency equal to 4 times the frequency fsc of the color subcarrier, the sampled portions of the signal convey a series of four different classes of the informations in a distribution shown in FIG. 1. In more detail, the chrominance signal reverses in phase from line to line, and is extracted four samples in each period of the color subcarrier.

In order to retrieve from such a television signal its luminance and chrominance components Y and C, the prior art makes use of such a forming filter as shown in FIG. 2 as the separator, wherein the arriving portion (Y−C) for the present line of the television signal is added to that portion for the preceding line which was delayed 1H in passing through a circuit 1, or the one (Y+C) by a first adder 2, because, as has been shown in FIG. 1, the chrominance signal in the same vertical position changes its phase 180° between the present and preceding lines. So, the output of the adder 2 represents 2Y. Its level is then attenuated ½ by a first attenuator 3 Thus, the luminance signal Y is separated out To separate out the chrominance signal C, the arriving television signal (Y−C) is routed to an inverter 4 and its output is added to the output of the 1H delay circuit 1 by a second adder 5. The output of the adder 5 which represents 2C is then attenuated ½ by a second attenuator 6.

It will be appreciated from the foregoing that the principle of such a conventional separator for the luminance and chrominance signals is based on the assumption that the picture element information in the form of a series of sampled portions of the composite color television signal has so strong a correlation in the vertical direction as to permit use of the picture element information of the preceding line for separating out the luminance and chrominance signals of the present line.

With such a conventional type, however, if a scene varies in brightness and color rapidly between the adjacent two of its sampled portions, these portions of the original scene will be reproduced with turbid color or dot hindrance or other deteriorations of the picture quality. Of these, the most serious is that the resolution drops extremely in the vertical direction particularly at the edges of things in the scene.

Attempts have been made to eliminate the above described problem by using a digital delay circuit that enables the correlation of picture elements in both vertical and horizontal directions to be taken into account. But, any of a wide variety of the previous proposals has an alternate problem in that the production cost becomes far higher than when the delay circuit is of the analog type.

SUMMARY OF THE INVENTION

The present invention has for its general object the provision of a video signal processing system which can overcome the above-described problems.

Another object of the invention is to provide a video signal processing system in which, depending on the vertical and horizontal correlations of a composite color television signal, the aforesaid composite color television signal can accurately be separated into luminance and chrominance signals.

Under such an object, according to the present invention, in one embodiment thereof, there is provided a video processing system which receives a composite television signal having frequency-multiplexed luminance and chrominance signals, in which the composite color television signal is divided into a plurality of picture element signals by sampling it, and the luminance and chrominance signals frequency-multiplexed in each of the plurality of picture element signals are separated, comprising:

remark picture element signal extracting means for extracting an arbitrary one of the plurality of picture element signals as a remark picture element signal;

first reference picture element signal extracting means for selecting as first reference picture element signals a first plurality of the sampled picture element signals whose chrominance signal frequency-multiplexed therein is of the same phase as that of the chrominance signal frequency-multiplexed in the remark picture element signal;

second reference picture element signal extracting means for selecting as second picture element signals a second plurality of the sampled picture element signals whose chrominance signal frequency-multiplexed therein is of phase reverse to that of the chrominance signal frequency-multiplexed in the remark picture element signal;

computed picture element signal forming means for forming plural kinds of computed picture element signals by receiving the remark picture element signals extracted by the remark picture element signal extracting means and the plurality of second reference picture element signals extracted by the second reference picture element signal extracting means and computing the computed picture element signals by use of the remark picture element signal and part of the plurality of second reference picture element signals;

correlation state signal output means for providing as outputs thereof a plurality of correlation state signals representing a correlation of each of the plurality of first reference picture element signals relative to the remark picture element signal and a correlation of each of the plurality of second reference picture element signals relative to the remark picture element signal by receiving the remark picture element signal extracted by the remark picture signal extracting means, the first reference picture element signals extracted by the first reference picture signals extracting means and the plurality of second reference picture element signals extracted by the second reference picture element signals extracting means, and then computer processing the remark picture element signals, a part of the plurality of first reference picture element signal and a part of the plurality of second reference signals; and separation means for selecting part of said plurality of computed picture element signals formed by the computed picture element signal forming means on the basis of the plurality of correlation state signals provided by the correlation state signal output means and separating and providing luminance signals and chrominance signals frequency-multiplexed in the remark picture element signal by using the selected part of the computed picture element signals.

The other objects and the other characteristic features of the invention will be understood from the detailed descriptions of the preferred embodiments of the invention which will be described with reference to the drawings.

Other objects than those described above of the invention and its features will become apparent from the following detailed description of embodiments thereof by reference to the accompanying drawings.

BRIEF DESCRIPTION OF THE DRAWINGS

FIG. 14 is a diagram illustrating correlation strengths and picture block selection.

DETAILED DESCRIPTION OF THE PREFERRED EMBODIMENTS

The present invention is next described in connection with embodiments thereof.

Figure 1:
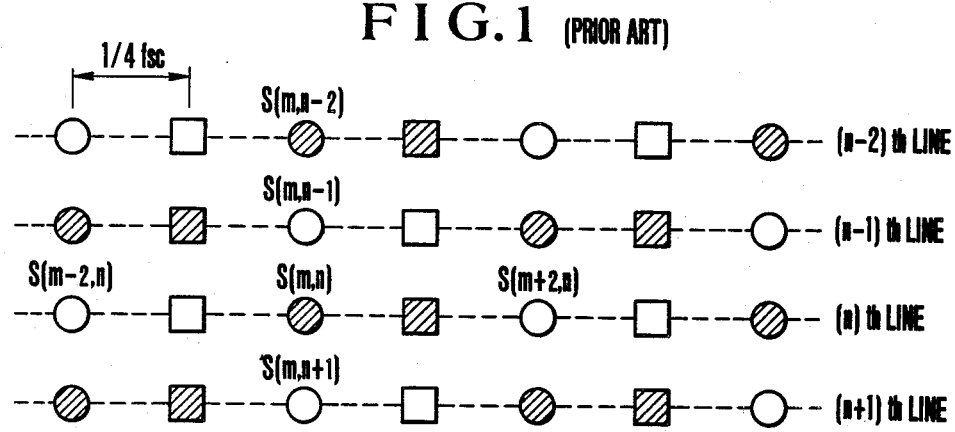
FIG. 1 is a diagram illustrating a series of sampled signals obtained by sampling a composite color television signal of the NTSC standards at a sampling frequency equal to 4 times the frequency of the color subcarrier.
Figure 2:
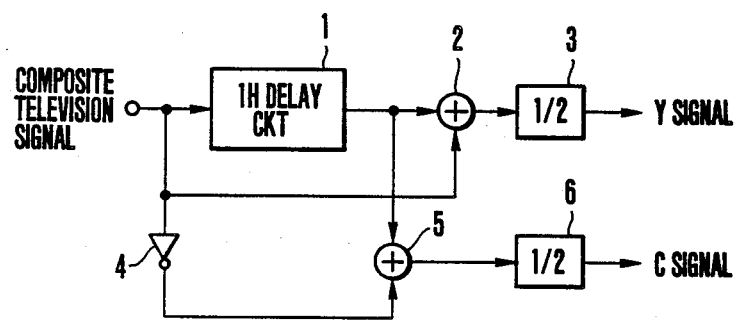
FIG. 2 is a diagram illustrating the outline of the construction of the conventional example of the forming filter for separating out the luminance and chrominance signals
Figure 3:
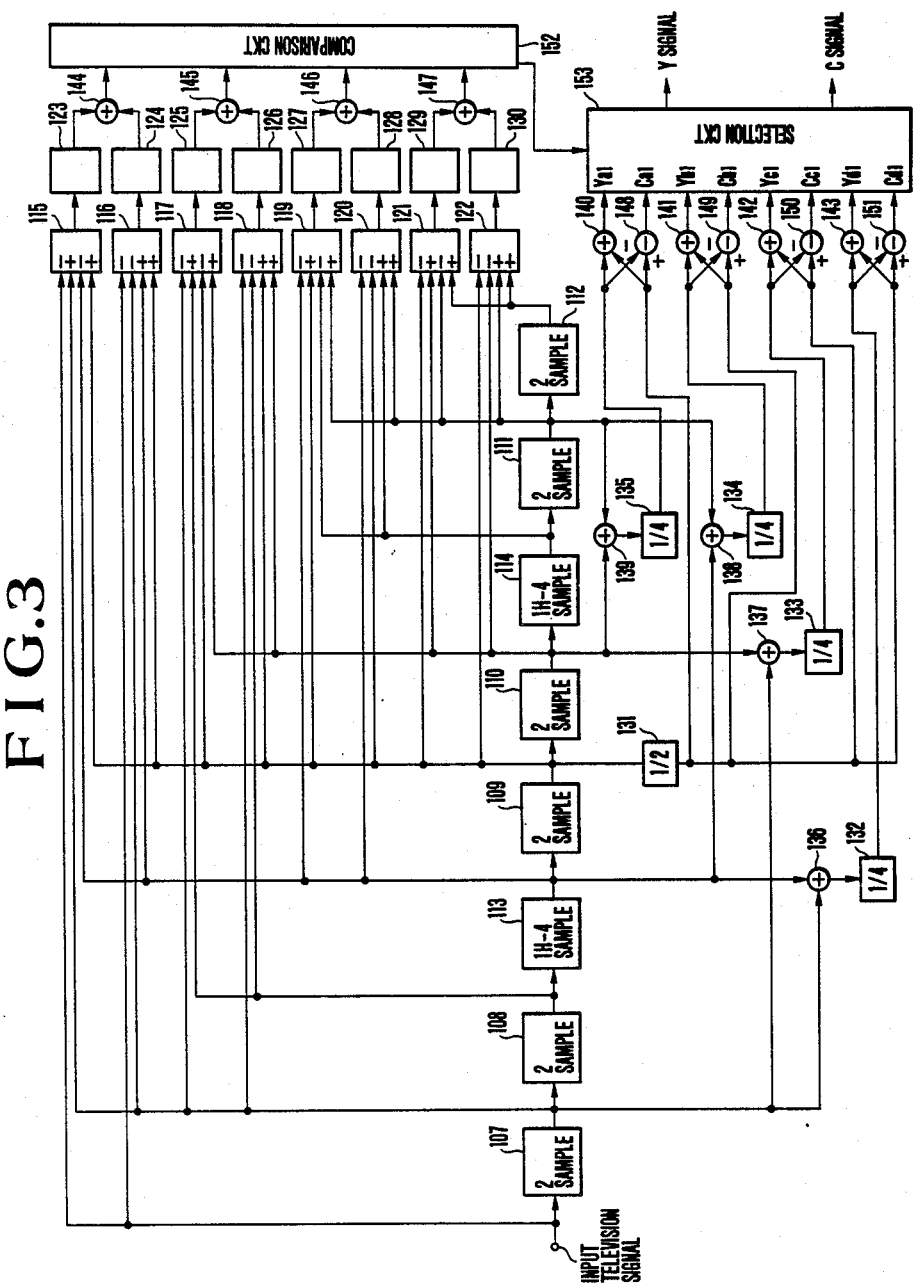
FIG. 3 is a schematic diagram illustrating the construction of a first embodiment of a luminance signal/chrominance signal separating circuit according to the present invention.

FIG. 3 in schematic electrical circuit diagram illustrates a first embodiment of the invention.

Figure 4:
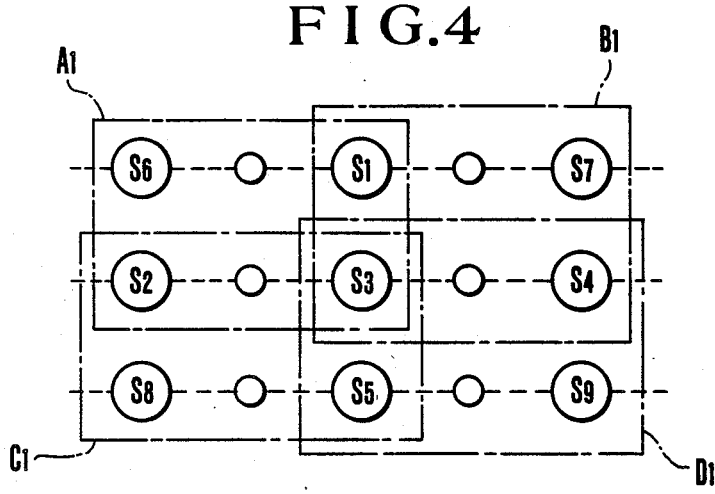
FIG. 4 is a diagram illustrating the relationship of the sampling points of the sampled signals of FIG. 1 with the structure of picture element blocks in the first embodiment shown in FIG. 3.

FIG. 4 illustrates a grouping scheme for the picture elements with an aim to detect their correlation The luminance signal/chrominance signal separation circuit of FIG. 3 comprises 2S delay circuits 107–112 (where S is one sampling period), 1H–4S delay circuits 113, 114 (where H is one horizontal line scanning period), adder-subtractor assemblies 115–122, absolute value converters 123–130, a $\frac{1}{2}$ level attenuator 131, $\frac{1}{4}$ level attenuators 132–135, adders 136–147, subtractors 148–151, a comparator circuit 152 and a selection circuit 153.

For example, in case when a composite color television signal of the NTSC standards is sampled at a frequency fs equal to 4 times the frequency fsc of the color subcarrier, the sampling points are distributed as shown in FIG. 4.

In FIG. 4, now, about the sampling point $S_3$, we explain the operation of separating the luminance signal and the chrominance signal.

In FIG. 3, when the composite color television signals of the NTSC standards sampled at the sampling frequency fs equal to 4 times the color subcarrier frequency fsc enter in sequence, picture element information signals for the sampling points $S_1$–$S_9$ shown in FIG. 4 are extracted at the same time by the 2S delay circuits 107–112 and 1H–4S delay circuits 113, 114. For note, the phases of the chrominance signals of the picture element information signals at such sampling points as shown in FIG. 4 fall in a relationship that the sampling points $S_6$, $S_7$, $S_8$ and $S_9$ are of the same phase as the sampling point $S_3$, while the sampling points $S_1$, $S_2$, $S_3$ and $S_5$ are reverse to the sampling point $S_4$. This is because the frequency at which the composite color television signal of the NTSC standards is sampled is taken at a value of 4 times the color subcarrier frequency fsc as has been described above The thus-obtained picture element information signals of the sampling points $S_1$–$S_9$ are separated into the luminance signals and the chrominance signals in each of picture element blocks $A_1$–$D_1$. The luminance signal Y and the chrominance signal C in the individual picture element blocks are given by the following expressions:

| Block $A_1$ | $Ya_1 = (S_1 + S_2 + 2S_3)/4$; |
| --- | --- |
| | $Ca_1 = (2S_3 - S_1 - S_2)/4$ |
| Block $B_1$ | $Yb_1 = (S_1 + S_4 + 2S_3)/4$; |
| | $Cb_1 = (2S_3 - S_1 - S_4)/4$ |
| Block $C_1$ | $Yc_1 = (S_5 + S_2 + 2S_3)/4$; |
| | $Cc_1 = (2S_3 - S_5 - S_2)/4$ |
| Block $D_1$ | $Yd_1 = (S_5 + S_4 + 2S_3)/4$; |
| | $Cd_1 = (2S_3 - S_5 - S_4)/4$ |

Therefore, by utilizing the above-defined relations, four separation filters are constructed with the ½ level attenuator 131, ¼ level attenuators 132-135, adders 136-143 and subtractors 148-151. The outputs of these filters which represent the luminance signals $Ya_1$-$Yd_1$ and chrominance signals $Ca_1$-$Cd_1$ are supplied to the selection circuit 153.

Here, in order to determine which of the luminance and chrominance signals separated by the above-described separation filters are to be placed onto the output lines of the selection circuit 157, the one of the picture element blocks $A_1$-$D_1$ which has a strongest correlation detected by the following method is searched out, and the luminance signal and chrominance signal which have been separated out of the picture element information signal of that block are selected as the outputs.

That is, using the adder-subtractor assemblies 115-122, absolute value converters 123-130 and adders 144-147, computation is performed based on the following formulae:

| | |
| --- | --- |
| $\|S_6 + S_1 - S_2 - S_3\| + \|S_6 - S_1 + S_2 - S_3\| = Ta_1$ | (1) |
| $\|S_1 + S_7 - S_3 - S_4\| + \|S_1 - S_7 + S_3 - S_4\| = Tb_1$ | (2) |
| $\|S_2 + S_3 - S_8 - S_5\| + \|S_2 - S_3 + S_8 - S_5\| = Tc_1$ | (3) |
| $\|S_3 + S_4 - S_5 - S_9\| + \|S_3 - S_4 + S_5 - S_9\| = Td_1$ | (4) |

For note, in the above-defined equations, the first term represents the correlation of the vertical direction of the luminance signal and the horizontal direction of the chrominance signal, and the second term represents the correlation of the horizontal direction of the luminance signal and the vertical direction of the chrominance signal. In either case, when the value is large, the correlation is weak, and when small, it becomes strong.

And, the above-described computation result is applied to the comparator circuit 152 wherein which of $Ta_1$-$Td_1$ has a smallest value is detected to produce a selection control signal. Responsive to this signal, the selection circuit 153 produces the $Ya_1$ and $Ca_1$ for $Ta_1$ of the smallest value, or the $Yb_1$ and $Cb_1$ for $Tb_1$ of the smallest value, or the $Yc_1$ and $Cc_1$ for $Tc_1$ of the smallest value, or the $Yd_1$ and $Cd_1$ for $Td_1$ of the smallest value, at the outputs thereof. Thus, the picture element information signal for the sampling point $S_3$ is separated into the luminance signal and the chrominance signal.

In such a manner, the separation of the luminance signal and the chrominance from the composite color television signal is controlled in accordance with the most proper one of the combinations of the vertical and horizontal correlations of the luminance and chrominance signals Though, in this embodiment, the full relationships of the equations (1) to (4) have been used in measuring the strength of correlation in each picture element block, it may otherwise be performed with the use of only one of the first and second terms so that the one of the blocks which has resulted in the smallest is determined to be the one having the strongest correlation. In this case, the structure can be simplified.

A second embodiment of the invention is next described.

Figure 5:
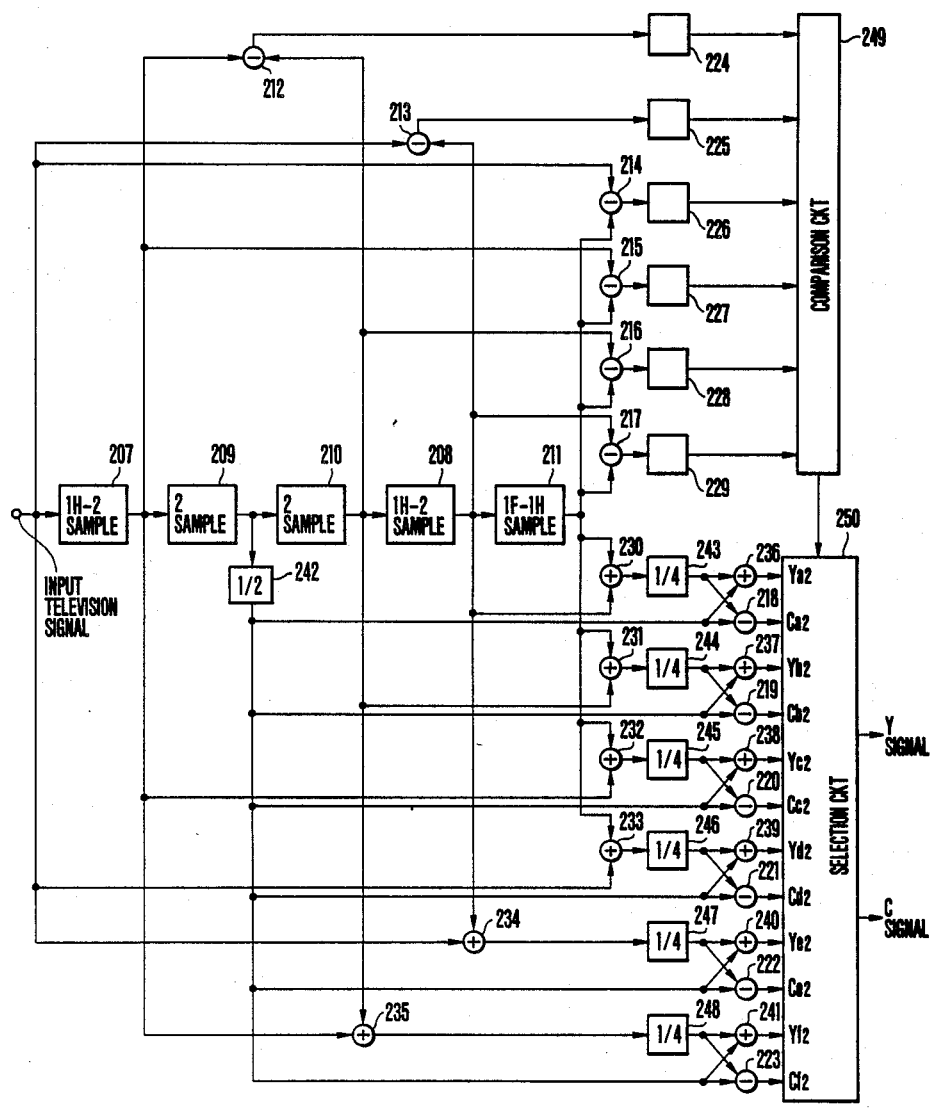
FIG. 5 is a schematic diagram illustrating the construction of a second embodiment of the luminance signal/chrominance signal separation circuit according to the present invention

FIG. 5 in schematic diagram illustrates another luminance signal/chrominance signal separation circuit as the second embodiment of the invention.

Figure 6:
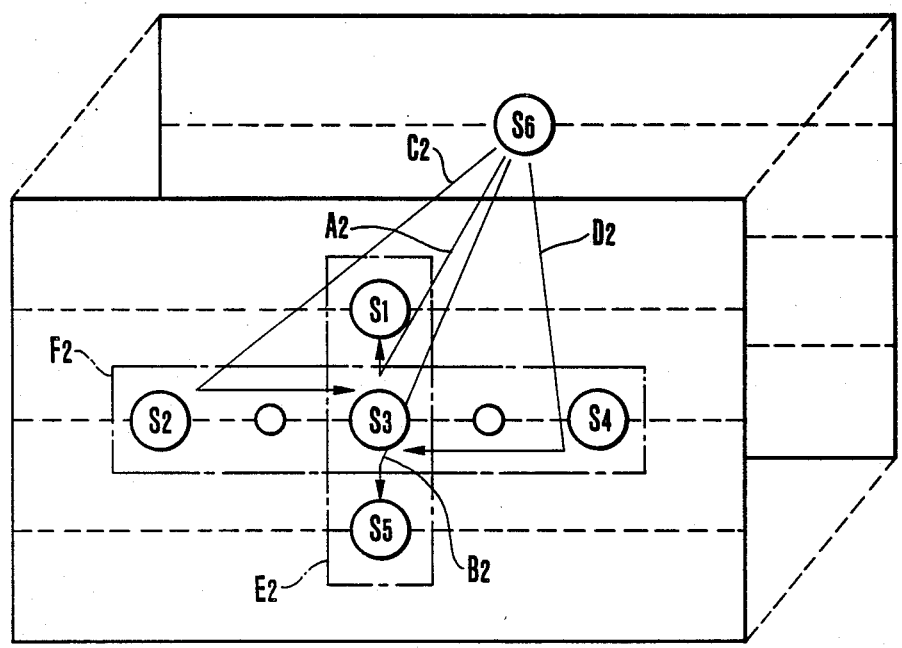
FIG. 6 is a diagram illustrating the relationship of the sampling points of the sampled signals of FIG. 1 with the structure of the picture element blocks in the second embodiment shown in FIG. 5.

FIG. 6 illustrates a scheme for grouping picture elements in order to determine the correlation of the picture elements In FIG. 5, the circuit comprises 1H-2S delay circuits 207, 208, 2S delay circuits 209, 210, a 1F-1H delay circuit 211 (where F is one frame scanning period), subtractors 212-223, absolute value converters 224-229, adders 230-241, a ½ level attenuator 242, ¼ level attenuators 243-248, a comparator circuit 249 and a selection circuit 250.

For example, when a composite color television signal of the NTSC standards is sampled at a sampling frequency fs equal to 4 times the color subcarrier frequency fsc, the sampling points are distributed as shown in FIG. 6.

In FIG. 6, now, about the sampling point $S_3$, the operation of separating the luminance and chrominance signals is explained.

In FIG. 5, when the sampled portions of the composite color television signal of the NTSC standards at the sampling frequency fs equal to 4 times the color subcarrier frequency fsc enter in sequence, they are processed through the 1H-2S delay circuits 207, 208, the 2S delay circuits 209, 210, and the 1F-1H delay circuits 211 so that the picture element information signals for the sampling points $S_1$-$S_6$ are extracted at the same time. For note, the phases of the chrominance signals of the picture element information signals at the sampling points shown in FIG. 6 fall in a relationship that the sampling points $S_1$, $S_2$, $S_4$, $S_5$ and $S_6$ are reverse to the sampling point $S_3$. This is because the sampling frequency fs for the composite color television signal of the NTSC standards is 4 times as large as the color subcarrier frequency fsc, as has been described above.

The thus-obtained picture element information signals of the sampling points $S_1$-$S_6$ are separated into the luminance and chrominance signals in each of the picture element groups $A_2$-$F_2$ shown in FIG. 6. The luminance signals Y and the chrominance signals C of the individual picture element groups are given by the following expressions

| Group $A_2$ | $Ya_2 = (2S_3 + S_6 + S_1)/4$; |
| --- | --- |
| | $Ca_2 = (2S_3 - S_6 - S_1)/4$ |
| Group $B_2$ | $Yb_2 = (2S_3 + S_6 + S_5)/4$; |
| | $Cb_2 = (2S_3 - S_6 - S_5)/4$ |
| Group $C_2$ | $Yc_2 = (2S_3 + S_6 + S_2)/4$; |
| | $Cc_2 = (2S_3 - S_6 - S_2)/4$ |
| Group $D_2$ | $Yd_2 = (2S_3 + S_6 + S_4)/4$; |
| | $Cd_2 = (2S_3 - S_6 - S_4)/4$ |
| Group $E_2$ | $Ye_2 = (2S_3 + S_1 + S_5)/4$; |
| | $Ce_2 = (2S_3 - S_1 - S_5)/4$ |
| Group $F_2$ | $Yf_2 = (2S_3 + S_2 + S_4)/4$; |
| | $Cf_2 = (2S_3 - S_2 - S_4)/4$ |

Therefore, based on the above-defined relationships, six separation filters are constructed with the ½ level attenuator 242, the ¼ level attenuators 243-248, the adders 230-241 and the subtractors 218-223. The outputs of these filters which represent the luminance signals Ya$_2$-Yf$_2$ and the chrominance signals Ca$_2$-Cf$_2$ are supplied to the selection circuit 250.

Here, in order to determine which of the separated luminance and chrominance signals by such individual separation filters as described above are to be placed onto the output lines of the selection circuit, the one of the picture element groups A$_2$-F$_2$ which has a strongest correlation detected by the following method is searched out, and the luminance signal and the chrominance signal which have been separated out of the picture element information signals of that group are selected as the outputs That is, using the subtractors 212-217 and the absolute value converters 224-229, computation is performed based on the following formulae:

$$|S_6 - S_1| = Ta_2; \ |S_6 - S_5| = Tb_2; \ |S_6 - S_2| = Tc_2$$
$$|S_6 - S_4| = Td_2; \ |S_1 - S_5| = Te_2; \ |S_2 - S_4| = Tf_2$$

For note, the equations for Ta$_2$-Td$_2$ represent that correlation of vertical and horizontal directions which takes into account the factor of the time axis direction, and the others for Te$_2$ and Tf$_2$ represent that correlation of vertical and horizontal directions which is limited to one frame In each equation, when the value is large, the correlation is weak, and when small, it is strong.

It is to be also noted that for determining the correlation, only those of the picture element information signals which have their chrominance signals of the same phase are used with an advantage of simplifying the structure of circuitry And, the above-described computation results are applied to the comparator circuits 249 wherein the smallest value is detected out of the Ta$_2$-Tf$_2$ to produce a selection control signal which is applied to the selection circuit 250. Hence, when Ta$_2$ is smallest, Ya$_2$ and Ca$_2$; when Tb$_2$ is smallest, Yb$_2$ and Cb$_2$; when Tc$_2$ is smallest, Yc$_2$ and Cc$_2$; when Td$_2$ is smallest, Yd$_2$ and Cd$_2$; when Te$_2$ is smallest, Ye$_2$ and Ce$_2$; and when Tf$_2$ is smallest, Yf$_2$ and Cf$_2$ are produced. Thus, the picture element information signal for the sampling point S$_3$ is divided into the luminance and chrominance signals in the form of the outputs of the separation circuit 250.

It will be appreciated from the foregoing that when the composite color television signal is separated into the luminance and chrominance signals, even the time axis direction of the luminance and chrominance signals is factored into the equation for determining the correlation of the luminance and chrominance signals, thereby an optimum separation is achieved.

A third embodiment of the invention is next described.

Figure 7:
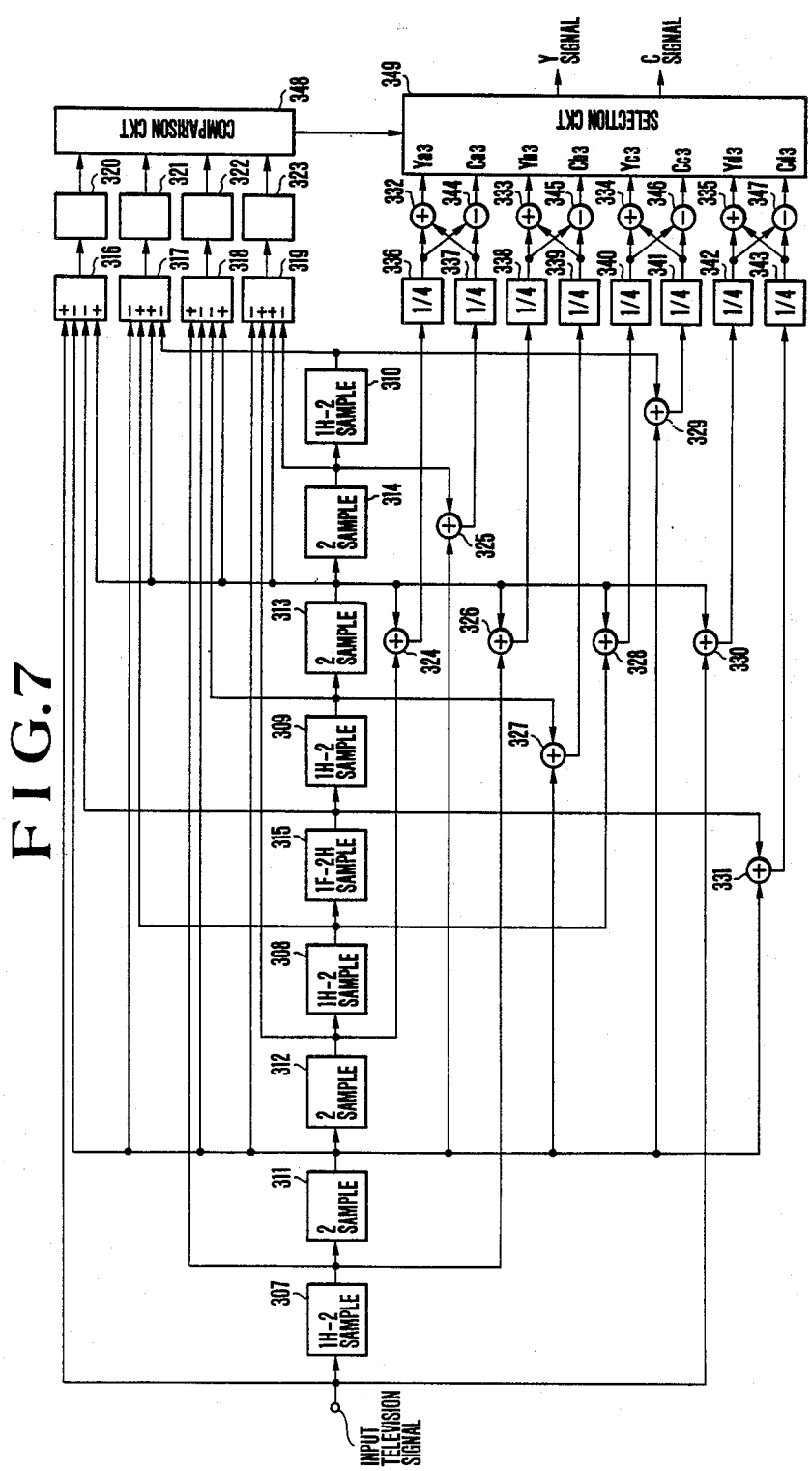
FIG. 7 is a schematic diagram illustrating the construction of a third embodiment of the luminance signal/chrominance signal separation circuit according to the present invention.

FIG. 7 in schematic diagram illustrates another luminance signal/chrominance signal separation circuit as the third embodiment of the invention.

Figure 8:
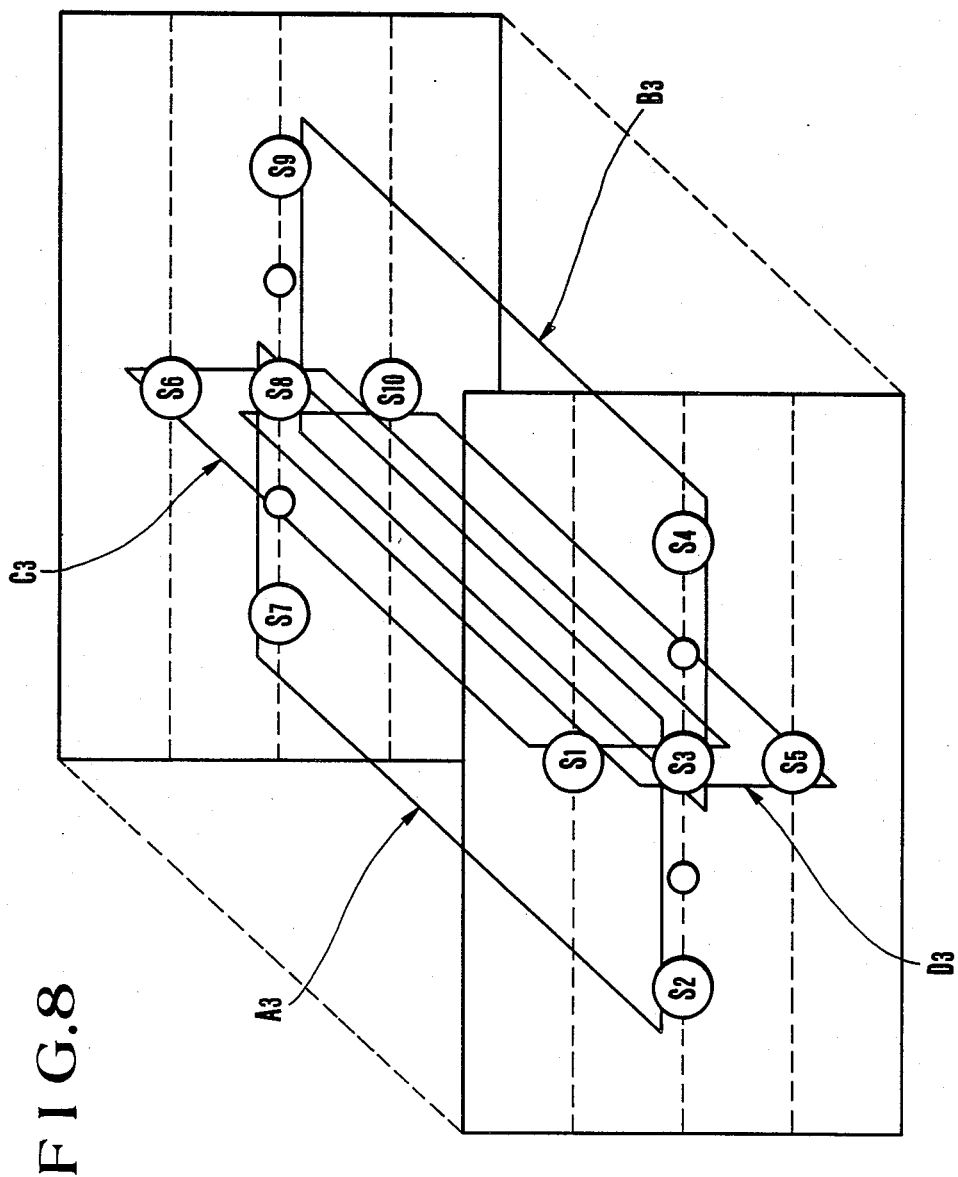
FIG. 8 is a diagram illustrating the relationship of the sampling points of the sampled signals of FIG. 1 with the structure of the picture element blocks in the third embodiment shown in FIG. 3.

FIG. 8 illustrates a grouping scheme of picture elements for evaluating the correlation of the picture elements in each group.

The circuit of FIG. 7 comprises 1H-2S delay circuits 307-310, 2S delay circuits 311-314, a 1F-2H delay circuit 315, adder-subtractor circuits 316-319, absolute value converters 320-323, adders 324-335, ¼ level attenuators 336-343, subtractors 344-347, a comparator circuit 348 and a selection circuit 349.

For example, when a composite color television signal of the NTSC standards is sampled with a sampling frequency fs equal to 4 times the color subcarrier frequency fsc, the sampling points are distributed as shown in FIG. 8.

In FIG. 8, now, about the sampling point S$_3$, the operation of separating out the luminance signal and the chrominance signal is explained.

In FIG. 7, when the sampled portions of the composite color television signal of the NTSC standards at the sampling frequency fs equal to 4 times the color subcarrier frequency fsc enter in sequence, they are processed through the 1H-2S delay circuits 207-210, the 2S delay circuit 211-214 and the 1F-2H delay circuit 215 so that the picture element information signals for the sampling points S$_1$-S$_{10}$ shown in FIG. 8 can be extracted at the same time.

It should be pointed out that the distribution of the sampling points as shown in FIG. 8 leads to a relationship that those of the picture element information signals which correspond to the sampling points S$_6$, S$_7$, S$_9$ and S$_{10}$ have their chrominance signals of the same phase as that of the chrominance signal of the sampling point S$_3$, while the others of the sampling points S$_1$, S$_2$, S$_4$, S$_5$ and S$_8$ are of the reverse phase to that of the sampling point S$_3$.

This is because the sampling frequency fs of the composite color television signal of the NTSC standards is taken at a value of 4 times the frequency fsc of the color subcarrier.

The thus-obtained picture element information signals of the sampling points S$_1$-S$_{10}$ are then separated into the luminance signals Y and the chrominance signals C in each of the picture element groups A$_3$-D$_3$. The luminance signals Y and the chrominance signals C for the individual picture element groups are given by the following expressions:

| | |
|---|---|
| Group A$_3$ | Ya$_3$ = (S$_8$ + S$_2$ + S$_7$ + S$_3$)/4; |
| | Ca$_3$ = (S$_8$ + S$_2$ − S$_7$ − S$_3$)/4 |
| Group B$_3$ | Yb$_3$ = (S$_8$ + S$_4$ + S$_9$ + S$_3$)/4; |
| | Cb$_3$ = (S$_8$ + S$_4$ − S$_9$ − S$_3$)/4 |
| Group C$_3$ | Yc$_3$ = (S$_8$ + S$_1$ + S$_6$ + S$_3$)/4; |
| | Cc$_3$ = (S$_8$ + S$_1$ − S$_6$ − S$_3$)/4 |
| Group D$_3$ | Yd$_3$= (S$_8$ + S$_5$ + S$_{10}$ + S$_3$)/4; |
| | Cd$_3$ = (S$_8$ + S$_5$ − S$_{10}$ − S$_3$)/4 |

Therefore, based on the above-defined relationships, four separation filters are constructed with the ¼ level attenuators 336-343, the adders 324-335 and the subtractors 344-347. The outputs of these filters which represent the luminance signals Ya$_3$-Yd$_3$ and the chrominance signals Ca$_3$-Cd$_3$ are supplied to the selection circuit 349.

Here, in order to determine which of the separated luminance and chrominance signals by such individual separation filters as described above are to be placed onto the output lines of the selection circuit 349, the one of the picture element groups A$_3$-D$_3$ which has a strongest correlation detected by the following method is searched out, and the luminance and chrominance signals separated out of the picture element information signal of that group are selected as the outputs.

That is, using the adder-subtractor circuits 316-319 and the absolute value converters 320-323, computation is performed based on the following formulae:

$$|S_8 + S_2 - S_7 - S_3| = Ta_3; \ |S_8 + S_4 - S_9 - S_3| = Tb_3;$$

$$|S_8 + S_1 - S_6 - S_3| = Tc_3; \quad |S_8 + S_5 - S_{10} - S_3| = Td_3$$

For note, the equations for $Ta_3$-$Td_3$ represent the correlation of the vertical and horizontal directions which takes into account the time axis direction. In each equation, when the value is large, the correlation is weak, and when small, it is strong.

And, the above-described computation results are applied to the comparator circuit 348 wherein the smallest value is detected out of the $Ta_3$-$Td_3$ to produce a selection control signal which is applied to the selection circuit 349. When $Ta_3$ is smallest, $Ya_3$ and $Ca_3$; when $Tb_3$ is smallest, $Yb_3$ and $Cb_3$; when $Tc_3$ is smallest, $Yc_3$ and $Cc_3$; and when $Td_3$ is smallest, $Yd_3$ and $Cd_3$ are produced as the outputs. Thus, the picture element information signal for the sampling point $S_3$ is separated into the luminance and chrominance signals in the form of the outputs of the selection circuit 349.

In such a manner, even the correlation of the time axis direction of the luminance and chrominance signals is taken into account when they are separated from the composite color television signal, thereby an optimum separation is achieved.

A fourth embodiment of the invention is next described.

Figure 9:
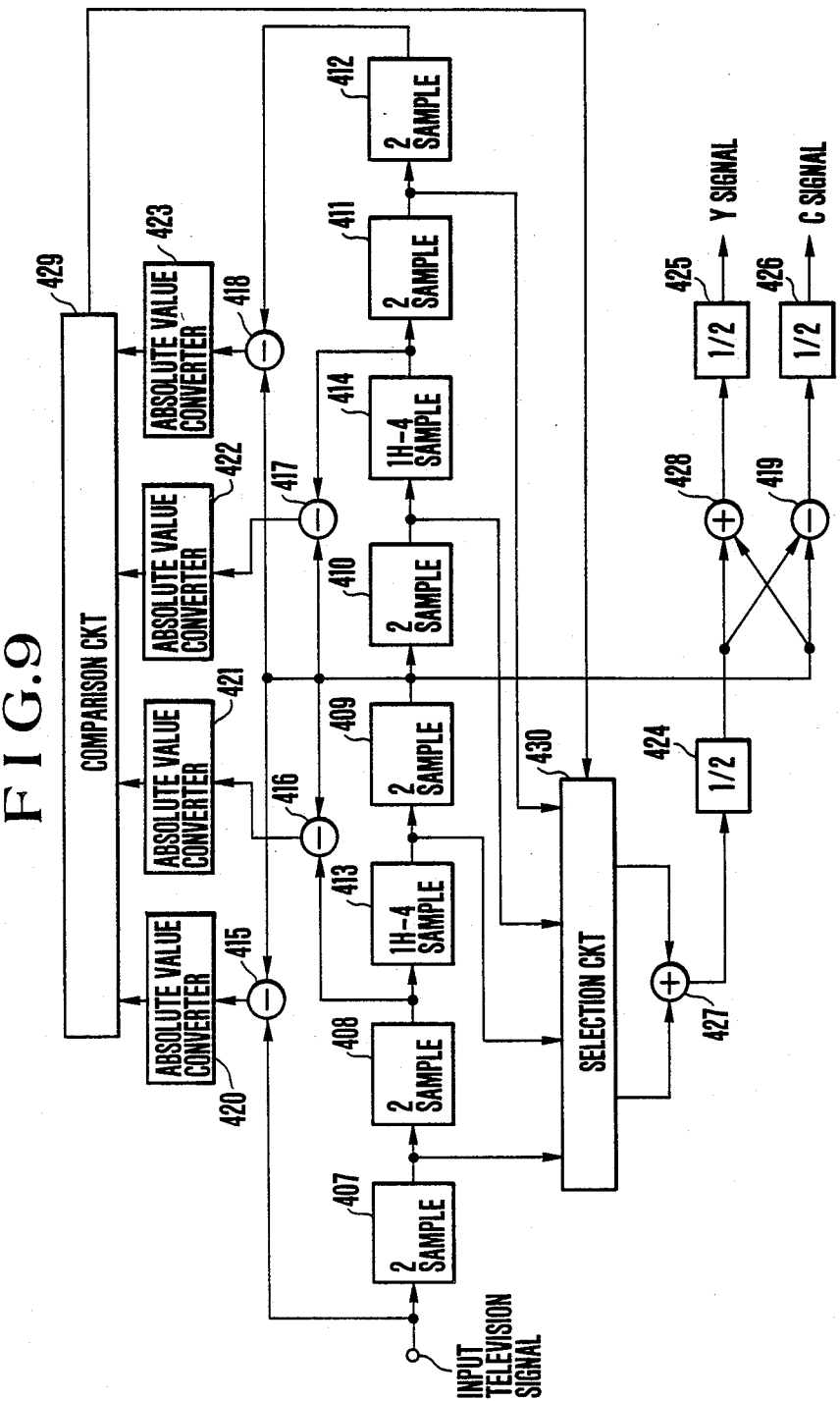
FIG. 9 is a schematic diagram illustrating the construction of a fourth embodiment of the luminance signal/chrominance signal separation circuit according to the present invention.

FIG. 9 in schematic diagram illustrates another luminance signal/chrominance signal separation circuit as the fourth embodiment of the invention.

Figure 10:
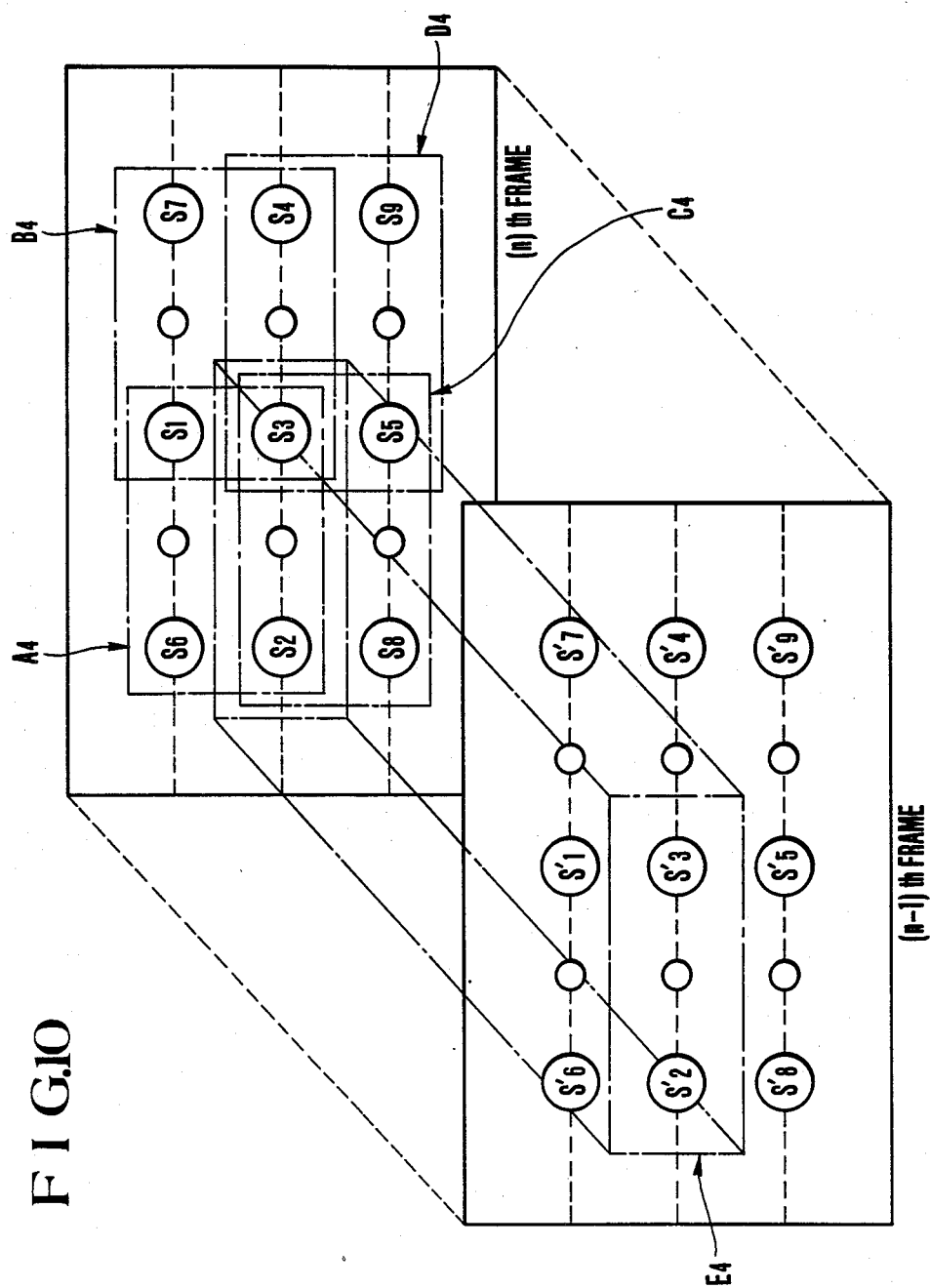
FIG. 10 is a diagram illustrating the relationship of the sampling points of the sampled signals of FIG. 1 with the structure of the picture element blocks in the fourth embodiment shown in FIG. 9.

FIG. 10 is a grouping scheme of picture elements for evaluating the correlation of the picture elements.

In FIG. 9, the circuit comprises 2S delay circuits 407–412, 1H–4S delay circuits 413, 414, subtractors 415–419, absolute value converters 420–423, ½ level attenuators 424–426, adders 427, 428, a comparator circuit 429 and a selection circuit 430.

For example, when a composite color television signal of the NTSC standards is sampled at a sampling frequency fs equal to 4 times the color subcarrier frequency fsc, the sampling points are distributed as shown in FIG. 10.

In FIG. 10, now, about the sampling point $S_3$, the operation of separating the luminance signal and the chrominance signal is explained.

In FIG. 9, when the sampled portions of the composite color television signal of the NTSC standards at the sampling frequency fs equal to 4 times the color subcarrier frequency fsc enter in sequence, they are processed through the 2S delay circuits 407–412 and the 1H–4S delay circuits 413, 414 so that the picture element information signals for the sampling points $S_1$-$S_9$ shown in FIG. 10 are extracted at the same time. For note, the phases of the chrominance signals of the picture element information signals of the sampling points show in FIG. 10 fall in a relationship that the sampling points $S_7$, $S_8$ and $S_9$ have the same phase as the sampling point $S_3$, and the sampling points $S_1$, $S_2$, $S_4$ and $S_5$ have the reverse phase to the sampling point $S_3$. This is because the sampling frequency for the composite color television signal of the NTSC standards is 4 times as large as the color subcarrier frequency fsc, as has been described above.

For every one of the thus-obtained picture element blocks $A_4$-$D_4$ shown in FIG. 10 comprised of the sampling points $S_1$-$S_9$, the luminance signal and the chrominance signal are separated out. The luminance signals Y and the chrominance signals C in the individual picture element blocks are given by the following expressions:

| | |
|---|---|
| Block $A_4$ | $Ya_4 = (2S_3 + S_1 + S_2)/4$, $Ca_4 = (2S_3 - S_1 - S_2)/4$ |
| Block $B_4$ | $Yb_4 = (2S_3 + S_1 + S_4)/4$, $Cb_4 = (2S_3 - S_1 - S_4)/4$ |
| Block $C_4$ | $Yc_4 = (2S_3 + S_2 + S_5)/4$, $Cc_4 = (2S_3 - S_2 - S_5)/4$ |
| Block $D_4$ | $Yd_4 = (2S_3 + S_4 + S_5)/4$, $Cd_4 = (2S_3 - S_4 - S_5)/4$ |

Therefore, the extracted picture element information signals $S_1$-$S_9$ are supplied to a separation filter constructed with the subtractor 419, the adders 427 and 428 and the ¼ level attenuators 424–426.

Here, in order to determine which of the picture element information signals $S_1$-$S_9$ is to be supplied to such separation filters as described above, the one of the picture element blocks $A_4$-$D_4$ which has a strongest correlation is searched out by the following method. Then, the picture information signal of that block is selected for application to the aforesaid separation filter. Hence, the luminance and chrominance signals are obtained in the form of the outputs of that separation filter.

That is, using the subtractors 415–418 and the absolute value converters 420–423, computation is performed based on the following formulae:

$$|S_3 - S_6| = Ta_4, \quad |S_3 - S_7| = Tb_4$$
$$|S_3 - S_8| = Tc_4, \quad |S_3 - S_9| = Td_4$$

For note, in the above-defined equations, when its result is large, the correlation is weak, and when small, it is strong. Also, in such evaluation of the correlation, use is made of only those of the information signals of the picture elements which have their chrominance signals of the same phase, thereby giving an advantage of making easier the computation and simpler the structure of the circuit.

And, the above-described computation result is applied to the comparator circuit 429, wherein the smallest value is detected out of the $Ta_4$-$Td_4$ to produce a selection control signal which is applied to the selection circuit 430 so that when $Ta_4$ is smallest, $S_1$ and $S_2$; when $Tb_4$ is smallest, $S_1$ and $S_4$; when $Tc_4$ is smallest, $S_2$ and $S_5$; or when $Td_4$ is smallest, $S_4$ and $S_5$ are placed onto the output lines of the selection circuit 430. Then, the selected picture element information signals are applied along with the picture element information signal of the sampling point $S_3$ to the separation filter wherein the above-described computation is performed to separate out the luminance signal and the chrominance signal from them.

In such a manner, optimum separation can be performed depending on the correlation of the luminance and chrominance signals in the same frame when the luminance signal and the chrominance signal are separated from the composite color television signal.

Figure 11:
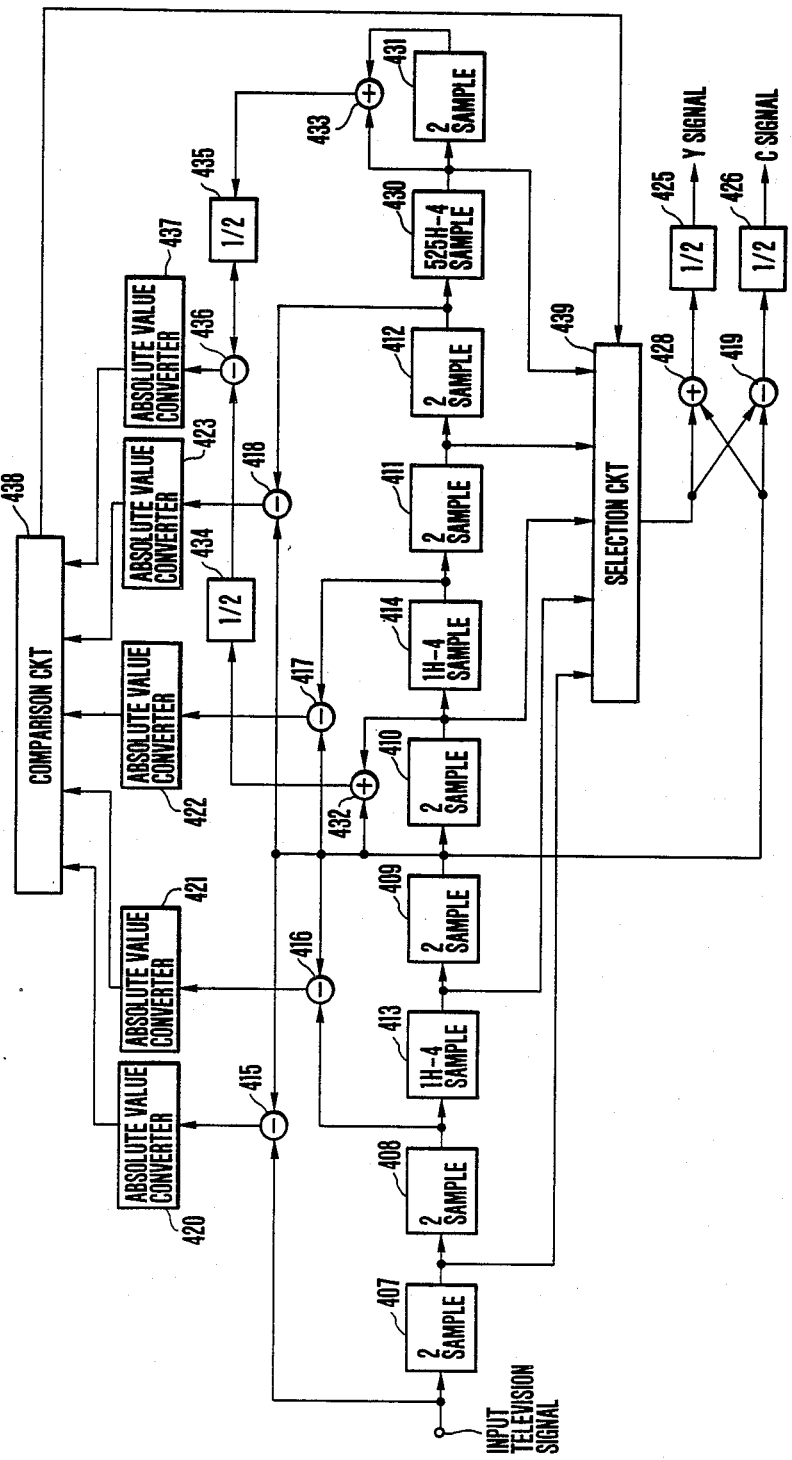
FIG. 11 is a schematic diagram illustrating the construction of a variation of the fourth embodiment of the invention (FIG. 9) in which time correlation of picture information is utilized.

FIG. 11 in schematic diagram illustrates another luminance signal/chrominance signal separation circuit as an example of variation of the fourth embodiment shown in FIG. 9 in which even the time correlation of the picture information is utilized.

In FIG. 11, the circuit includes a 525H–2S delay circuit 430, a 2S delay circuit 431, adders 432, 433, ½ level attenuators 434, 435, a subtractor 436, an absolute value converter 437, a comparator circuit 438 and a selection circuit 439. The similar parts to those shown in FIG. 9 are denoted by the same numerals.

We next explain about the operation of FIG. 11. In FIG. 11, similarly to FIG. 9, the sampled portions of the composite color television signal of the NTSC standards at the sampling frequency fs equal to 4 times the color subcarrier frequency fsc enter and are processed through the similar delay circuits 407–414 to those shown in FIG. 9, the 525H-4S delay circuit 430 and 2S delay circuit 431 so that the picture element information signals for the sampling points $S_1$–$S_9$ and $S_2'$, $S_3'$ shown in FIG. 10 are extracted at the same time.

And, similarly to FIG. 9, in order to evaluate the correlation of the picture elements on one frame, the absolute values $Ta_4$–$Td_4$ of the difference between the sampling point $S_3$ and each of the sampling points $S_6$, $S_7$, $S_8$ and $S_9$ obtained by the subtractors 415–418 and the absolute value converters 420–423 are applied to the comparator circuit 437, and, at the same time, the picture element information signals for the sampling points $S_2$ and $S_3$ extracted by the 2S delay circuits 409, 410 are applied to the adder 432. Meanwhile, the picture element information signals for the sampling points $S_2'$ and $S_3'$ that precede respectively the sampling points $S_2$ and $S_3$ by just one frame are applied to the adder 433. The outputs of these two adders 432 and 433 after having been attenuated to half levels by the ½ level attenuators 434 and 435 respectively are applied to the subtractor 436. Hence, a computation result: $|(S_2+S_3)-(S_2'+S_3')|/2=Te_4$ from the absolute value converter 437 enters the comparator circuit 438.

In the comparator circuit 438, which computation result, $Ta_4$–$Te_4$, is larger than the other is examined. The computation results $Ta_4$–$Td_4$ represent the correlations of the picture elements on one and the same frame, and the one $Te_4$ represents the time-dependent correlation of the picture elements. When the value is large, the correlation is weak, and when small, it is strong. So, which of the $Ta_4$–$Te_4$ is smallest is detected. Depending on this result, the picture element information signals of the sampling points $S_1$, $S_2$, $S_4$, $S_5$ and $S_3'$ are selectively outputted.

That is, a selection control signal is formed in the comparator circuit 438 and is applied therefrom to the selection circuit 439 so that when $Ta_4$ is smallest, $(S_1+S_2)/2$, when $Tb_4$ is smallest, $(S_1+S_4)/2$; when $Tc_4$ is smallest, $(S_2+S_5)/2$; when $Td_4$ is smallest, $(S_4+S_5)/2$; or when $Te_4$ is smallest, $S_3'$ is placed onto the output line of the selection circuit 439. Of the output signals from the selection circuit 439, concerning the separation of the luminance and chrominance signals by using the picture element information signals in the picture element blocks $A_4$–$D_4$, a similar computation to that shown in FIG. 9 is performed by the adder 428, the subtractor 419, and the ½ level attenuators 425 and 426 to separate out the luminance and chrominance signals. Concerning the other block $E_4$ shown in FIG. 10, when $Te_4$ is determined in the comparator circuit 438 to be smallest, the selection circuit 439 produces the output signal representing the picture element information of the sampling point $S_3'$. Then, $Ye_4=(S_3+S_3')/2$ and $Ce_4=(S_3-S_3')/2$ are computed by the adder 428, the subtractor 419 and the ½ level attenuators 425 and 426 to separate out the luminance and chrominance signals.

In such a manner, by this embodiment, when the composite color television signal is separated into the luminance and chrominance signals, not only the correlation within the present frame but also the correlation between it and the preceding frame is taken into account in determining which picture element block has a strongest correlation to permit the picture element information signal within that picture element block to be used for separating out the luminance an chrominance signals.

A fifth embodiment of the invention is next described.

Figure 12:
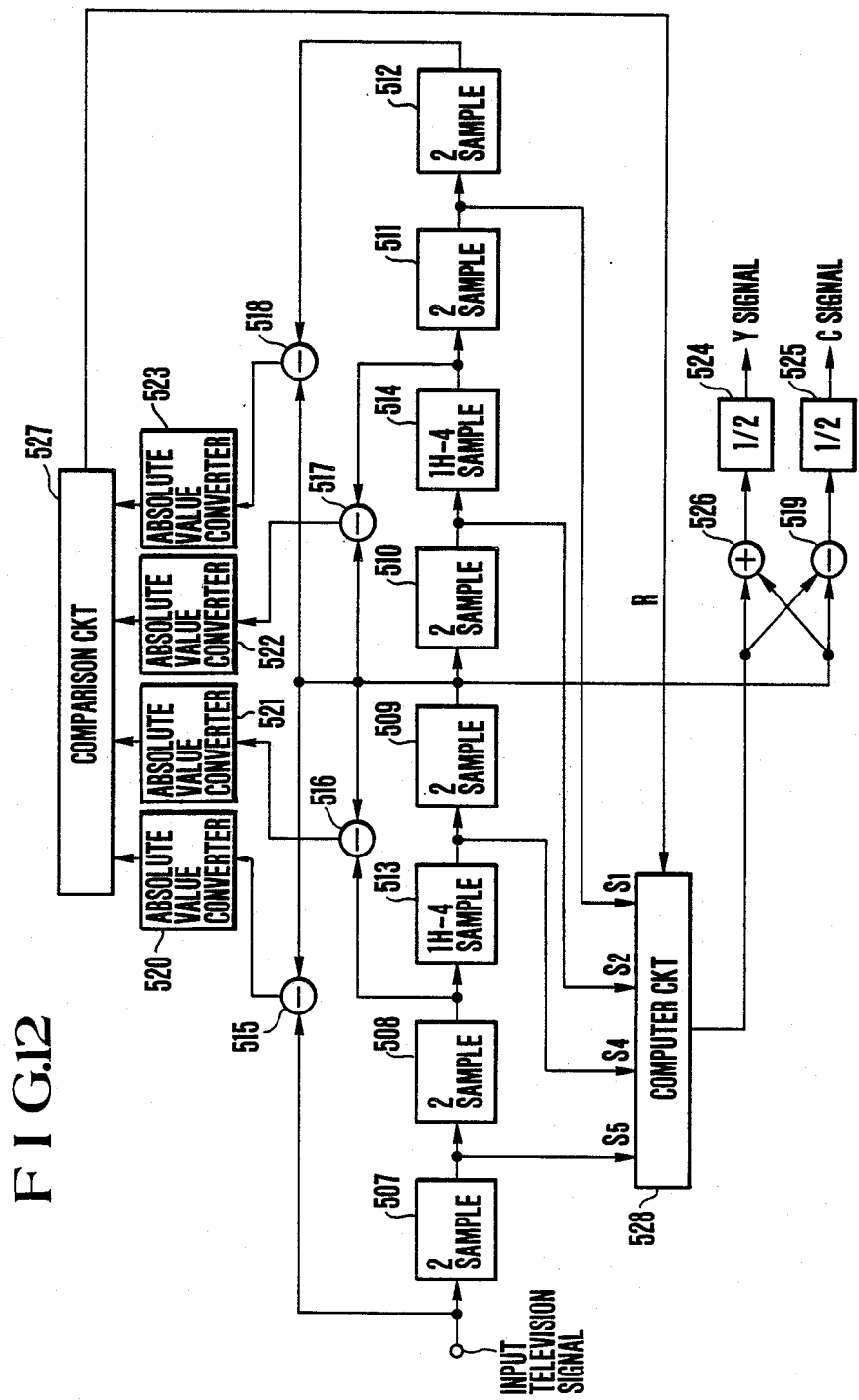
FIG. 12 is a schematic diagram illustrating the construction of a fifth embodiment of the invention.

FIG. 12 in schematic diagram illustrates another luminance signal/chrominance signal separation circuit as the fifth embodiment of the invention.

In FIG. 12, the circuit comprises 2S delay circuits 507–512, 1H-4S delay circuits 513, 514, subtractors 515–519, absolute value converters 520–523, ½ level attenuators 524, 525, an adder 526, a comparator circuit 527 and a computer circuit 528.

Figure 13:
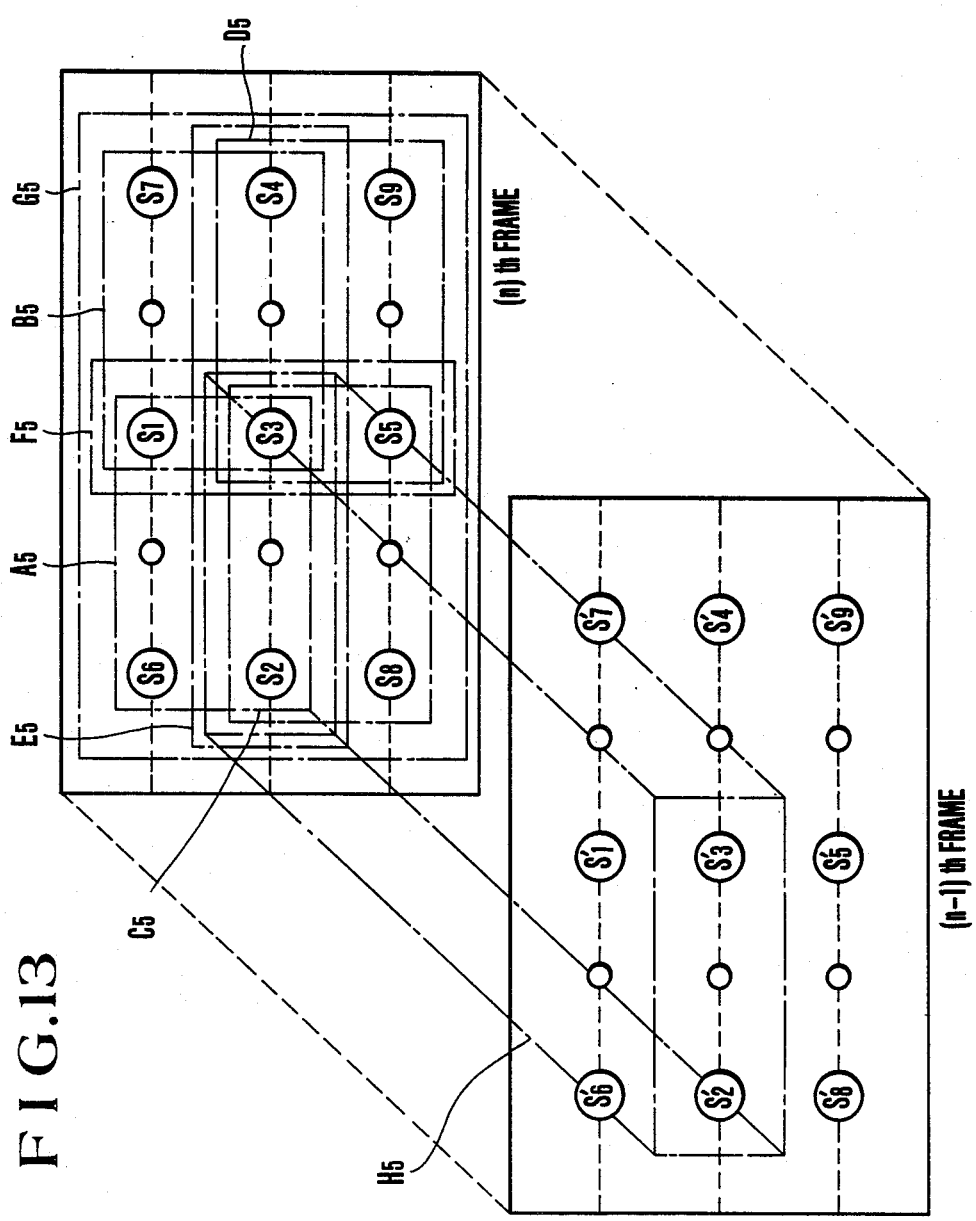
FIG. 13 is a diagram illustrating the relationship of the sampling points of the sampled signals with the structure of picture element blocks in the fifth embodiments of the invention shown in FIG. 12.

For example, when a composite color television signal of the NTSC standards is sampled at a sampling frequency fs equal to 4 times the color subcarrier frequency fsc, the sampling points are distributed as shown in FIG. 13.

In FIG. 13, now, about the sampling point $S_3$, the operation of separating out the luminance an chrominance signals is explained.

In FIG. 12, when the sampled portions of the composite color television signal a the sampling frequency fs equal to 4 times the color subcarrier frequency fsc enter in sequence, they ar processed through the 2S delay circuits 507–512 and the 1H-4S delay circuits 513, 514 so that the picture element information signals for the sampling points $S_1$–$S_9$ are extracted at the same time. For note, the phases of the chrominance signals of the picture element information signals of such sampling points as shown in FIG. 13 fall in a relationship that the sampling points $S_6$, $S_7$, $S_8$ and $S_9$ are the same phase as the sampling point $S_3$, and the sampling points $S_1$, $S_2$, $S_4$ and $S_5$ are the reverse phase to the sampling point $S_3$. This is because the sampling frequency fs for the composite color television signal of the NTSC standards is 4 times as large as the color subcarrier frequency fsc.

For every one of the thus-obtained picture element blocks $A_5$–$H_5$ shown in FIG. 13 comprised of the sampling points $S_1$–$S_9$, the luminance signal and the chrominance signal ar separated out. The luminance signals Y and the chrominance signals C of the individual picture element blocks are given by the following expressions:

Block $A_5$ $Ya_5 = (2S_3 + S_1 + S_2)/4$, $Ca_5 = (2S_3 - S_1 - S_2)/4$;
Block $B_5$ $Yb_5 = (2S_3 + S_1 + S_4)/4$, $Cb_5 = (2S_3 - S_1 - S_4)/4$;
Block $C_5$ $Yc_5 = (2S_3 + S_2 + S_5)/4$, $Cc_5 = (2S_3 - S_2 - S_5)/4$;
Block $D_5$ $Yd_5 = (2S_3 + S_4 + S_5)/4$, $Cd_5 = (2S_3 - S_4 - S_5)/4$;
Block $E_5$ $Ye_5 = (2S_3 + S_2 + S_4)/4$, $Ce_5 = (2S_3 - S_2 - S_4)/4$;
Block $F_5$ $Yf_5 = (2S_3 + S_1 + S_5)/4$, $Cf_5 = (2S_3 - S_1 - S_5)/4$;
Block $G_5$ $Yg_5 = (4S_3 + S_1 + S_2 + S_4 + S_5)/8$,
$Cg_5 = (4S_3 - S_1 - S_2 - S_4 - S_5)/8$ Based on these relationships, the luminance and chrominance signals are separated out. Therefore, of the picture element information signals of the extracted sampling points $S_1$–$S_9$, the ones of those of the sampling points which constitute the selected picture element block depending on the evaluation result of the correlation in the comparator circuit 527 to be described later can be used in separating out the luminance and chrominance signals by performing such computations as described above.

Here, which of the picture element information signals for the sampling points $S_1$–$S_9$ should be used in separating out the luminance and chrominance signals is explained.

The comparator circuit 527 receptive of the picture element information signals of the extracted sampling points $S_1$–$S_9$ discriminates the correlation states of the picture elements by the following method, the selects one of the picture element blocks $A_5$–$G_5$ depending on the correlation state, computes the picture element information signals constituting the selected block on the basis of the corresponding one of the above-described equations for the luminance and chrominance signals, and produces the luminance and chrominance signals.

That is, using the subtractors 515–518 and the absolute value converters 520–523, computation is performed base on the following formulae:

$$|S_3 - S_6| = Ta_5, |S_3 - S_7| = Tb_5,$$
$$|S_3 - S_8| = Tc_5, |S_3 - S_9| = Td_5$$

Each of the above-defined equations represents the absolute value of the difference between the picture element signal of the sampling point $S_3$ for which the luminance and chrominance signals are to be separated out and that of each of those of the sampling points which surround $S_3$ and are the same in the phase of the chrominance signal as $S_3$, namely, $S_6$, $S_7$, $S_8$ and $S_9$. The use of the picture element signals of such sampling points of the same phase of the chrominance signal makes easier the computation for evaluating the correlation and simpler the structure of the circuit.

And, in the comparator circuit 527, each of the above-described values $Ta_5$–$Td_5$ is compared with their mean value: $Ts_5 = (Ta_5 + Tb_5 + Tc_5 + Td_5)/4$. The one or ones of the values $Ta_5$–$Td_5$ which is or are lower than the mean value $Ts_5$ is or are determined to be strong in correlation between any paired sampling points to take the difference. Depending on the arrangement of the sampling points determined to have the strong correlation, which picture element should be used in computing for separation of the luminance and chrominance signals is determined.

For example, when the sampling point of strong correlation with the sampling point $S_3$ is one in number, the one of the picture element blocks $Ta_5$–$Td_5$ which includes that sampling point is selected. Then, using the picture element signals of those of the sampling points which constitute the selected block, the luminance and chrominance signals are separated out by the above-described computation.

Alternatively assuming that the number of sampling points of strong correlation is two, and these two sampling points vertically lie side by side, then the correlation is determined to be strong in the vertical direction, leading to selection of the picture element block $F_5$. When they lie horizontally side by side, the correlation is then determined to be strong in the horizontal direction, leading to selection of the picture element block $E_5$. When they lie diagonally side by side, the correlation is determined to be strong in the diagonal direction, leading to selection of the picture element block $G_5$. Then, likewise as before, the picture element signals of those of the sampling points which constitute the selected picture element block are used in separating out the luminance and chrominance signals by the above-described computation.

Also, when the number of sampling points of strong correlation is three, the space surrounded by these three sampling points is then determined to have a strong correlation. So, the one of the picture element blocks $A_4$–$D_5$ which includes these three sampling points is selected. Then, the picture element signals of the sampling points constituting the selected block are used in separating out the luminance and chrominance signals by the above-described computation.

Further, when the differences between the picture element signals of the sampling point $S_3$ and any of the sampling points $S_6$, $S_7$, $S_8$ and $S_9$ all are equal to each other, the space surrounded by these four sampling points is then determined to have a strong correlation, leading to selection of the picture element block $G_5$. The picture element signals of the sampling points constituting the selected block are used in separating out the luminance and chrominance signals by the above-described computation.

The discrimination results described above are summarized in FIG. 14. According to the scheme shown in FIG. 14, from the picture element information signals of the sampling points applied to the comparator circuit 527, the correlation state between the picture elements is discriminated. Using the picture element information signals of those of the sampling points which constitute the picture element block selected on the basis of that discrimination, the computation for separation of the luminance and chrominance signals is carried out by the computer circuit 528, the adder 526, the subtractor 519 and the ½ level attenuators 524 and 525.

Figure 15:
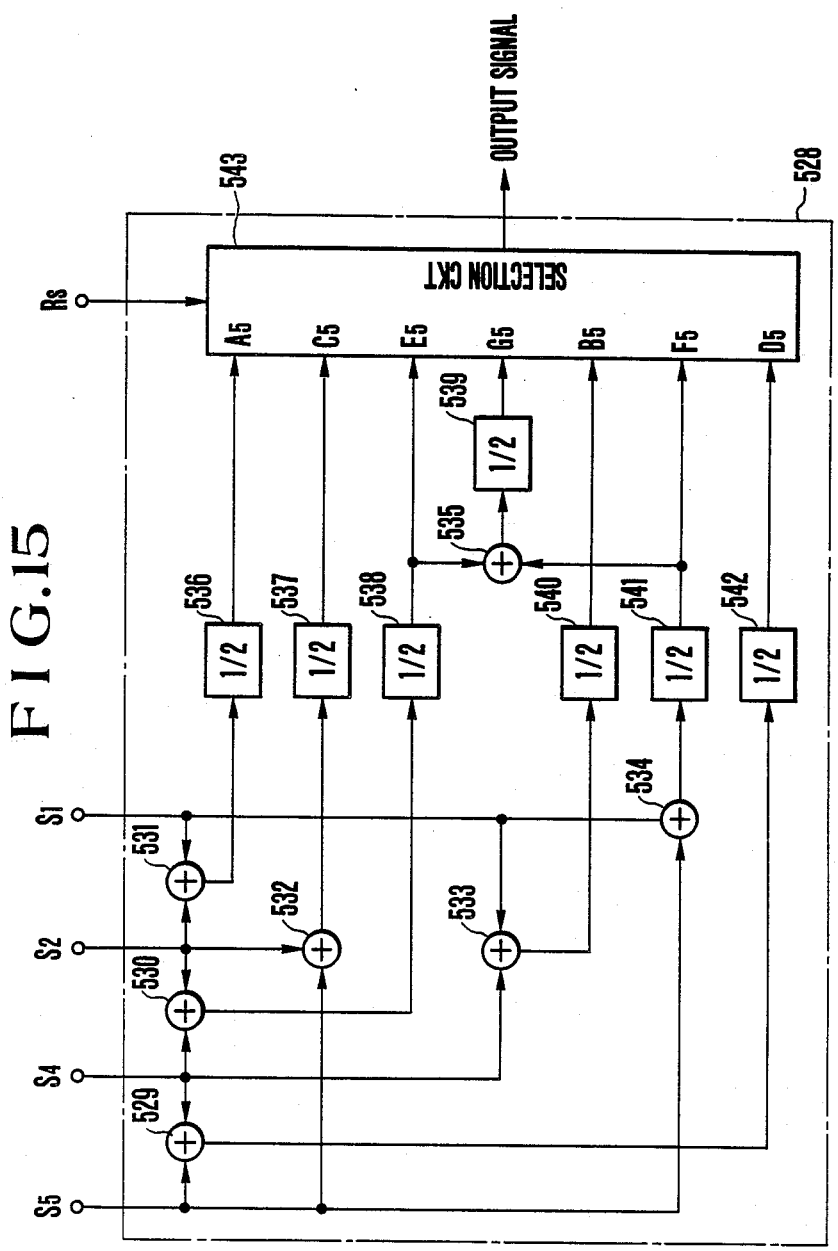
FIG. 15 is a schematic diagram illustrating a construction for computer circuit 528 of FIG. 12.

FIG. 15 schematically illustrates the construction of the above-described computer circuit 528. Applied to this computer circuit 528 are the picture element information signals of the sampling points $S_1$, $S_2$, $S_4$ and $S_5$ which are different in the phase of the chrominance signal by 180° from the sampling point $S_3$ for which the luminance and chrominance signals are separated out. These signals are processed for computation by adders 529–535 and a ½ level attenuator 542, and then applied to a selection circuit 543.

To this selection circuit 543, as has been described above, an equivalent selection control signal Rs to the signal R is applied from the comparator circuit 527. By this control signal R (see FIG. 12), the corresponding inputs to the picture element blocks $A_5$–$G_5$ are selectively placed onto the output line of the computer circuit 528. This output is combined with the picture element information signal of the sampling point $S_3$ by the adder 526 and the subtractor 519. The outputs of the adder 526 and subtractor 519 are attenuated to halved levels by the respective attenuators 524 and 525, thus producing the luminance and chrominance signals in separation based on the above-described equations, In such a manner, when the luminance and chrominance signals are separated out of the composite color television signal, optimum separation can be performed depending on the correlation of the luminance and chrominance signals in one and the same frame.

Figure 16:
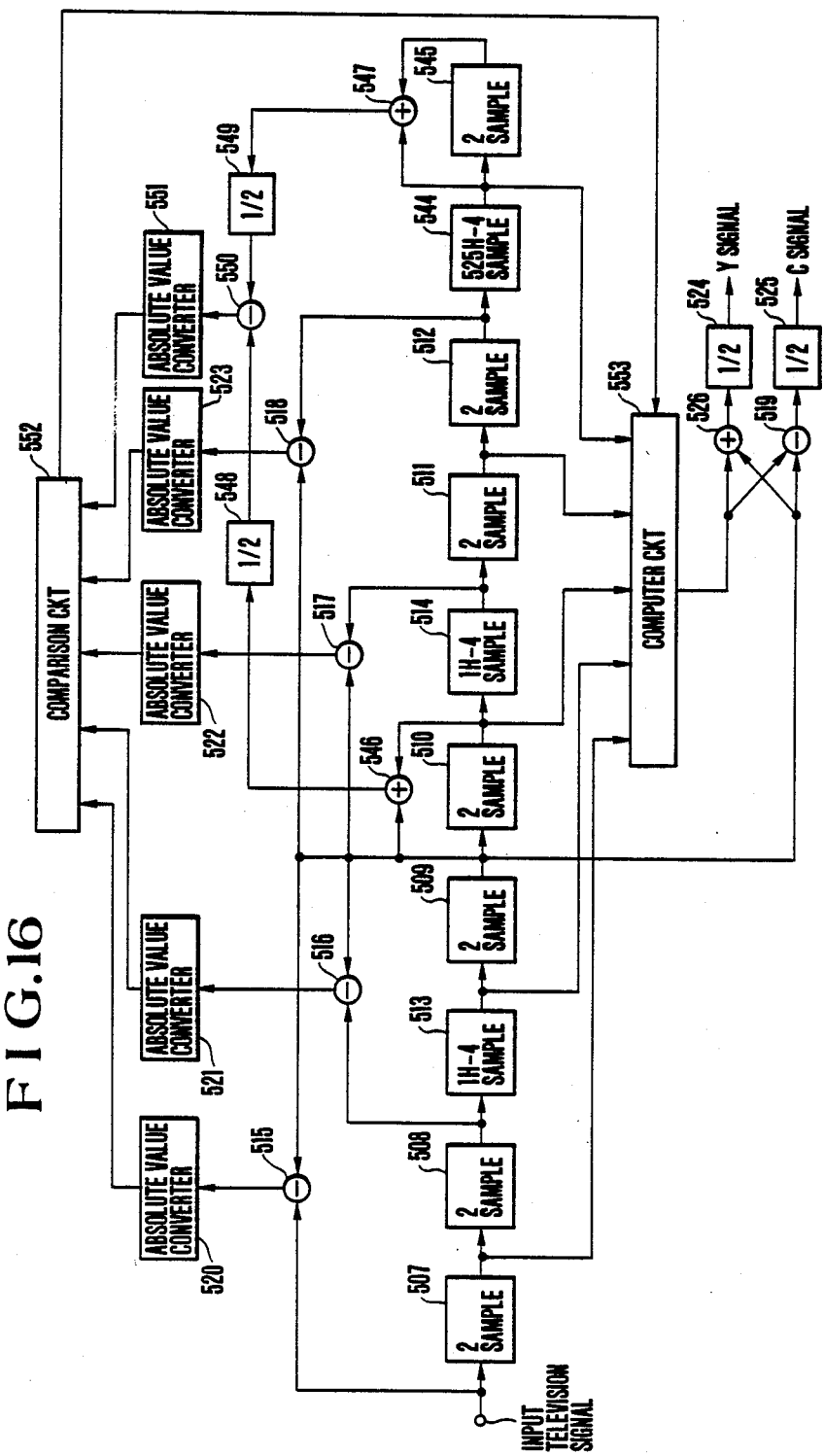
FIG. 16 is a schematic diagram illustrating the construction of a variation of the fifth embodiment of the invention shown in FIG. 12.

FIG. 16 in schematic diagram illustrates another luminance signal/chrominance signal separation circuit utilizing the time-dependent correlation of the picture information as an example of variation of the fifth embodiment of the invention shown in FIG. 12

In FIG. 16, the circuit includes a 525H–2S delay circuit 544, a 2S delay circuit 545, adders 546, 547, ½ level attenuators 548, 549, a subtractor 550, an absolute value converter 551, a comparator circuit 552 and a computer circuit 553. The other parts which are similar to those shown in FIG. 12 are denoted by the same reference numerals.

The operation of the circuit of FIG. 16 is next described. Similarly to FIG. 12, when the sampled portions of the composite color television signal of the NTSC standards at the sampling frequency fs equal to 4 times the frequency fsc of the color subcarrier enter in sequence, they are processed through the similar delay circuits 507-514 to those of FIG. 12, the 525H-4S delay circuit 544 and the 2S delay circuit 545 so that the picture element information signals of the sampling points $S_1$–$S_9$ and $S_2'$, $S_3'$ are extracted at the same time.

And, similarly to FIG. 12, in order to evaluate the correlation of the picture elements in one and the same frame, the absolute values $Ta_5$–$Td_5$ of the differences between the picture elements of the sampling point $S_3$ and each of the sampling points $S_6$, $S_7$, $S_8$ and $S_9$ are computed by the subtractors 515-518 and the absolute value converters 520-523, and the outputs of the latter are applied to the comparator circuits 552. At the same time, the picture element information signals of the sampling points $S_2$ and $S_3$ extracted by the 2S delay circuits 509 and 510 are applied to the adder 546. Meanwhile, the picture element information signals of the sampling points $S_2'$ and $S_3'$ which occur just one frame before the sampling points $S_2$ and $S_3$ respectively, are applied to the adder 547. The outputs of these two adders 546 and 547 after having been attenuated to their halved levels by the ½ level attenuators 548 and 549 respectively are applied to the subtractor 550. Then, a computation result: $|(S_2+S_3)-(S_2'+S_3')|/2=Te_5$ is applied from the absolute value converter 551 to the comparator circuit 552.

It is in this embodiment that in the comparator circuit 552, the correlation to be discriminated is included with the time-dependent one, and, for this purpose, all the computation results $Ta_5$–$Te_5$ are used.

That is, when the discrimination results in finding that the time-dependent correlation is strong, the picture element information signals of the sampling points constituting a block H which includes the sampling points $S_2'$ and $S_3'$ of the preceding frame are used in separating out the luminance and chrominance signals If the time-dependent correlation is weak, a similar operation to that described in connection with FIG. 12 is performed so that either one of the picture element blocks $A_5$–$G_5$ which all lie within the present frame is used so that the picture element information signals of the sampling points constituting that block are used in separating out the luminance and chrominance signals.

Now, how to discriminate between the weak and strong time-dependent correlations is explained.

In the comparator circuit 552, the mean value $Ts_5$ of the computation results $Ta_5$–$Td_5$ of FIG. 12 is compared with the computation result $Te_5$. If $Te_5$ is larger than $Ts_5$, for the time-dependent correlation is weak, the above-described picture element blocks $A_5$–$G_5$ are used in separating out the luminance and chrominance signals. If $Te_5$ is not larger than $Ts_5$, for the time-dependent correlation is strong, the picture element block $H_5$ is used in separating out the luminance and chrominance signals.

In such a manner, which of the blocks is to be used in separating out the luminance and chrominance signals is determined by the comparator circuit 553, and a selection control signal corresponding to the selected one of the picture element blocks $A_5$–$H_5$ is applied to the computer circuit 553.

Figure 17:
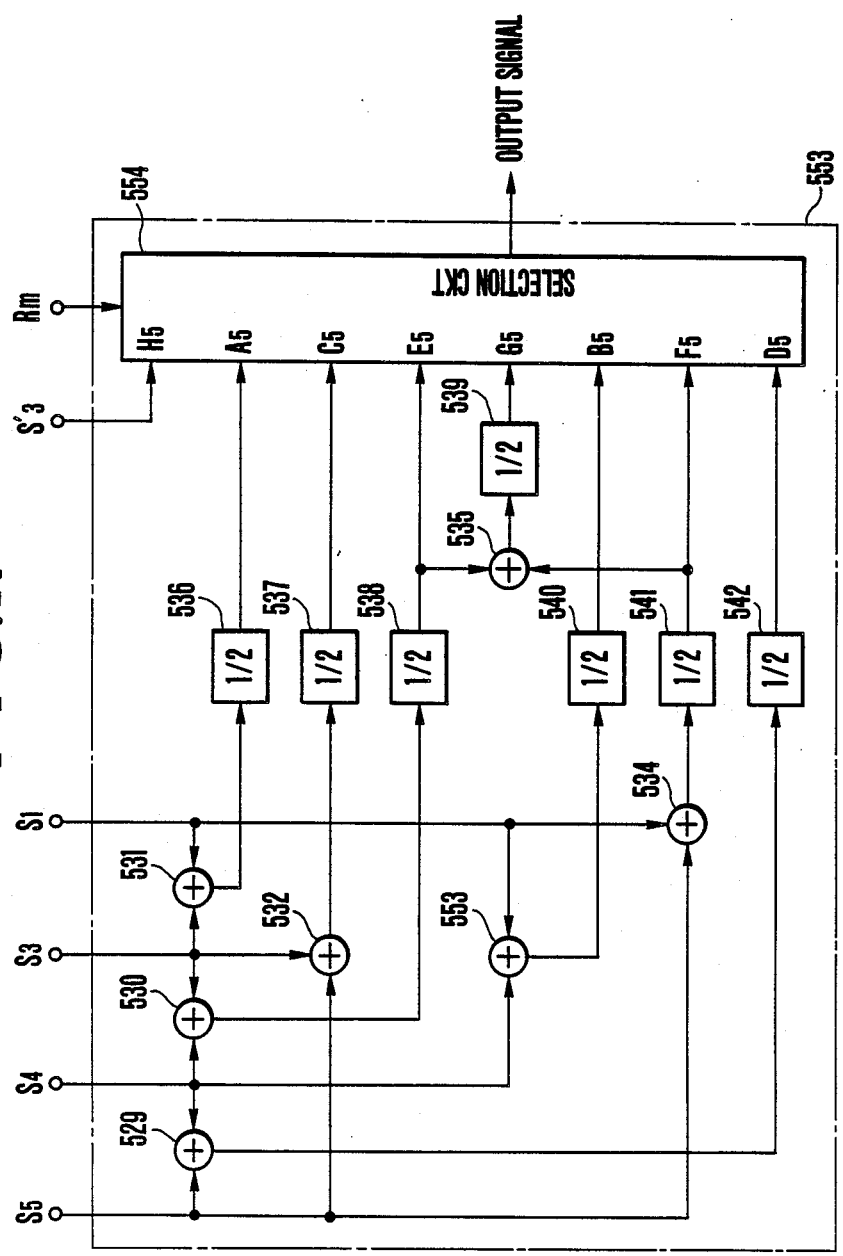
FIG. 17 is a schematic diagram illustrating a construction for computer circuit 553 of FIG. 16.

FIG. 17 schematically illustrates the construction of the above-described computer circuit 53, wherein the same reference numerals have been employed to denote the similar parts to those shown in FIG. 16.

To the computer circuit 553 are applied the picture element information signals of the sampling points $S_1$, $S_2$, $S_4$ and $S_5$ which are different in the phase of the chrominance signal by 180° from the sampling point $S_3$ for which the luminance and chrominance signals are separated out. Similarly to FIG. 15, after the computation for the separation of the luminance and chrominance signals in the picture element blocks $A_5$–$G_5$ has been carried out, they enter the terminals $A_5$–$G_5$ of the selection circuit 554. Also, in FIG. 17, the picture element information signal of the corresponding sampling point $S_3'$ of the preceding frame to the position of the sampling point $S_3$ of the present frame is supplied to a terminal $H_5$ of the selection circuit 554.

And, the inputs of the selection circuit 554 are selectively placed onto its output line depending on the picture element block by the aforesaid selection control signal $R_m$. For example, when it is determined in the comparator circuit 553 to be the picture element block $A_5$, the input at the terminal $A_5$ is placed onto the output line.

Further, the signal produced from the selection circuit 554 is then processed by the adder 526, the subtractor 519 and the ½ level attenuator 524 to separate out the luminance and chrominance signals Also, if the time-dependent correlation is strong, the separation of the luminance and chrominance signals is carried out by the picture element information signals of the sampling points constituting the picture element block $H_5$. Based on a formula for the picture element block $H_5$: $Yh_5=(S_3+S_3')/2$, $Ch_5=(S_3-S_3')/2$, the luminance and chrominance signals are separated out.

In such a manner, in this embodiment, for the separation of the luminance and chrominance signals from the composite color television signal, not only the correlation within the present frame, but also the correlation between the present and preceding frames is taken into account to permit selection of the picture element block to be performed depending on the distribution of the sampling points of strong correlation, and to enable the use of the picture element information signals within that block in separating out the luminance and chrominance signals.

In the foregoing embodiments as the delay circuits use is made of the analog type with the aim of achieving a reduction of the cost. Yet, it is obvious that this invention enables application of digital delay circuits.

Also, though, in the embodiments, the signal to be processed is the composite color television signal of the NTSC standards with the sampling frequency equal to 4 times the frequency of the color subcarrier, it is to be understood that the present invention is applicable to other signals such as those of PAL or SECAM standards with slight modification of the picture element grouping scheme.

What is claimed is:

1. A video processing system for use in an apparatus that receives a composite television signal having frequency-multiplexed luminance and chrominance signals, in which said composite color television signal is divided into a plurality of picture element signals by sampling it, and the luminance and chrominance signals frequency-multiplexed in each of said plurality of picture element signals are separated, comprising:

(a) remark picture element signal extracting means for selecting an arbitrary one of said plurality of picture element signals as a remark picture element signal;

(b) first reference picture element signal extracting means for selecting as first reference picture element signals a first plurality of said sampled picture element signals whose chrominance signal frequency-multiplexed therein is of the same phase as that of the chrominance signal frequency-multiplexed in said remark picture element signal;

(c) second reference picture element signal extracting means for selecting as second picture element signals a second plurality of said sampled picture element signals whose chrominance signal frequency-multiplexed therein is of phase reverse to that of the chrominance signal frequency-multiplexed in said remark picture element signal;

(d) computer picture element signal forming means for forming plural kinds of computed picture element signals by receiving said remark picture element signals extracted by said remark picture element signal extracting means and said plurality of second reference picture element signals extracted by said second reference picture element signal extracting means and computing said computed picture element signals by use of said remark picture element signal and part of said plurality of second reference picture element signals;

(e) correlation state signal output means arranged to input said remark picture element signal extracted by said remark picture element signal extracting means, said plurality of first reference picture element signals extracted by said first reference picture element signal extracting means and said plurality of second reference element signals extracted by said second reference picture element signal extracting means, and to effect processing of said remark picture element signal, a part of said plurality of first reference picture element signals and a part of said plurality of second reference picture element signals, thereby outputting a plurality of correlation state signals representing correlation of the respective ones of said plurality of first reference picture element signals and the respective ones of said plurality of second reference picture element signals relative to said remark picture element signal; and (f) separation means for selecting part of said plurality of computed picture element signals formed by said computed picture element signal forming means on the basis of said plurality of correlation state signals provided by said correlation state signal output means and separating and providing luminance signals and chrominance signals frequency-multiplexed in said remark picture element signal by using said selected part of said computed picture element signals.

2. A system according to claim 1, wherein said remark picture element signal extracting means includes a first delay circuit in which a plurality of picture element signals from an input line thereof are placed in delay of m picture elements (where m is a positive integer) onto an output line thereof.

3. A system according to claim 2, wherein said first reference picture element signal extracting means includes a plurality of second delay circuits whose delay times for a plurality of picture element signal inputs are different from one another and from that of said first delay circuit.

4. A system according to claim 3, wherein said second reference picture element signal extracting means includes a plurality of third delay circuits whose delay times for a plurality of picture element signal inputs are different from one another and from those of said first delay circuit and said second delay circuits.

5. A system according to claim 1, wherein said separation means includes:

(a) a computation circuit for computing with said plurality of computed picture element signals formed by said computed picture element signal forming means to provide as an output a plurality of kinds of luminance signals and chrominance signals;

(b) a comparison circuit for comparing said plurality of correlation state signals produced by said correlation state signal output means with each other; and (c) a selection and output circuit for selecting and providing as an output thereof one kind of luminance signal and one kind of chrominance signal out of said plurality of kinds of luminance and chrominance signals in accordance with the results of such comparison by said comparison circuit.

6. A system according to claim 5, wherein said computation circuit includes adding circuits and subtracting circuits.

7. A system according to claim 1, wherein said separation means includes:

(a) a comparison circuit for comparing said plurality of correlation state signals produced by said correlation state signal output means with each other;

(b) a selection and output circuit for electing and providing as an output part of said computed picture element signals formed by said computed picture element signal forming means in accordance with the results of the comparison by the comparison circuit; and (c) a computation circuit for computing such part of the computed picture element signals provided by said selection and output circuit to produce an output luminance signal and an output chrominance signal.

8. A system according to claim 1, wherein said computing circuit includes adding circuits and subtracting circuits.

9. A video processing system for use in an apparatus that receives a composite television signal having frequency-multiplexed luminance and chrominance signals, in which said composite color television signal for every one frame is divided into a plurality of picture element signals by sampling it, and the luminance and chrominance signals frequency-multiplexed in each of said plurality of picture element signals are separated, comprising:

(a) remark picture element signal extracting means for selecting an arbitrary one of said plurality of picture element signals as a remark picture element signal and extracting said remark picture element signal from said plurality of picture element signals;

(b) first reference picture element signal extracting means for selecting a picture element signal whose chrominance signal frequency-multiplexed therein is of the same phase as that of the chrominance signal frequency-multiplexed in said remark picture element signal as a first reference picture element signal, and extracting out of said plurality of picture element signals said first reference picture element signal respectively for four picture elements;

(c) second reference picture element signal extracting means for selecting a picture element signal whose chrominance signal frequency-multiplexed therein is of phase reverse to that of the chrominance signal frequency-multiplexed in said remark picture element signal and extracting out of said plurality of picture element signals said second reference picture element signal repetitively for four picture elements;

(d) selecting means for forming a plurality of picture element signal groups each including said remark picture element signal and being comprised of picture element signals corresponding to a predetermined number of picture elements by using said remark picture element signal extracted by said remark picture element signal extracting means, said first reference picture element signal for four picture elements extracted by said first reference picture element signal extracting means, and said second reference picture element signal for four picture elements extracted by said second reference picture element signal extracting means and detecting correlation degree among the picture element signals comprising the picture element signal groups to select the picture element signal group of strongest correlation degree, and (e) separating means for separating the luminance signals and chrominance signals frequency-multiplexed in said remark picture element signal by using the remark picture element signal and the second reference picture element signal comprising the picture element signal group selected by said selecting means.

10. A system according to claim 9, wherein said remark picture element signal extracting means includes a first delay circuit in which a plurality of picture elements inputs are placed in delay of a m picture elements (where m is a positive integer) onto its output line.

11. A system according to claim 10, wherein said first reference picture element sign all extracting means includes four second delay circuits whose delay times for an input of a plurality of picture element signal are different from one another and from that of said first delay circuit.

12. A system according to claim 11, wherein said second reference picture element signal extracting means includes four third delay circuits whose delay times for an input of a plurality of picture element signals are different from one another and from those of said first and said second delay circuits.

13. A system according to claim 9, wherein selecting means includes:

(a) a plurality of first computation circuits for computing the picture elements signals comprising each of the picture element signal groups to produce as an output correlation signals corresponding to correlation degree between said picture element signals, (b) a comparison circuit for comparing a plurality of correlation signals produced by said plurality of first computation circuits to indicate the picture element signal group of strongest correlation degree.

14. A system according to claim 13, wherein said first computing circuit includes an adding circuit and a subtracting circuit.

15. A system according to claim 13, wherein said separating means includes:

(a) second computation circuit for forming a plurality of picture element signal groups including the remark picture element signal and being comprised of picture element signals corresponding to a predetermined number of picture elements by using the remark picture element signal extracted by said remark picture element signal extracting means, said first reference picture element signal for four picture elements extracted by said first reference picture element signal extracting means and said second reference picture element signal for four picture elements extracted by said second reference picture element signal extracting means, and computing said remark picture element signal and said second reference picture element signal contained in said picture element signals comprising each of the picture element signal groups to form and output a luminance signal and a chrominance signal for each signal group, and (b) an output circuit for providing as an output a luminance signal and a chrominance signal corresponding to the picture element signal group indicated by said indication signal provided by said comparison circuit out of the luminance signals and chrominance signals corresponding to respective picture element signal groups provided by said second computation circuit.

16. A system according to claim 15, wherein said second computing circuit includes an adding circuit and a subtracting circuit.

17. A system according to claim 13, wherein said separating means includes:

(a) a second computation circuit for forming a plurality of picture element signal groups including the remark picture element signal and being comprised of picture element signals corresponding to a predetermined number of picture element by using said remark picture element signal extracted by said remark picture element signal extracting means and said second reference picture element signal for four picture elements extracted by said second reference picture element signal extracting means, and computing said remark picture element signal and said signal reference picture element signal contained in said picture element signals comprising each of the picture element signal groups to form and output a luminance signal and a chrominance signal for each signal group, and (b) an output circuit for computing a luminance signal and a chrominance signal corresponding to the picture element signal group indicated by said indication signal provided by said comparison circuit out of the luminance signals and chrominance signals corresponding to respective picture element signal groups provided by said second computation circuit.

18. A system according to claim 17, wherein said second computing circuit includes an adding circuit and a subtracting circuit.

* * * * *

UNITED STATES PATENT AND TRADEMARK OFFICE
CERTIFICATE OF CORRECTION

Page 1 of 2

PATENT NO. : 4,882,615
DATED : November 21, 1989
INVENTOR(S) : Katsuji Yoshimura, et al.

It is certified that error appears in the above-identified patent and that said Letters Patent is hereby corrected as shown below:

ON TITLE PAGE:

[54] After "SYSTEM" insert -- WITH ADAPTIVE LUMINANCE CHROMINANCE SIGNAL SEPARATION -- .

Col. 1, line 47.  After "3" insert -- . -- .
Col. 1, line 48.  After "out" insert -- . -- .
Col. 4, line 12.  Change "ments" to -- ment --.
Col. 7, lines 1-2.  Change "$Ya-_2 Yf_2$" to -- $Ya_2 - Yf_2$ --.
Col. 7, line 13.  After "outputs" insert -- . --.
Col. 7, line 26.  After "one frame" insert -- . --.
Col. 7, line 67.  Change "standars" to -- standards --.
Col. 9, line 55.  Change "show" to -- shown --.
Col. 12, line 3.  Change "an" to -- and --.
Col. 12, line 20.  Change "an" to -- and --.
Col. 12, line 23.  Change "a" to -- at --.
Col. 12, line 25.  Change "ar" to -- are --.
Col. 12, line 41.  Change "ar" to -- are --.
Col. 15, line 41.  After "signals" insert -- . --.
Col. 15, line 68.  Change "53" to -- 553 --.
Col. 16, line 27.  After "signals " insert -- . --.
Col. 17, line 41.  Change "correlation" to --correlations --.
Col. 19, line 1.  Change "respectively" to -- repetitively --.
Col. 19, line 39.  Change "ments" to -- ment --.
Col. 19, line 42.  Change "sign all" to -- signal --.
Col. 19, line 44.  Change "signal" to -- signals --.

UNITED STATES PATENT AND TRADEMARK OFFICE
CERTIFICATE OF CORRECTION

PATENT NO. : 4,882,615

DATED : November 21, 1989

INVENTOR(S) : Katsuji Yoshimura, et al.

It is certified that error appears in the above-identified patent and that said Letters Patent is hereby corrected as shown below:

Col. 20, line 42. After "element" insert -- signals --.

Col. 20, line 49. Change "signal" second occurrence to -- second --.

Col. 7, line 32, after "circuitry" insert --.---.

Signed and Sealed this

Third Day of December, 1991

Attest:

HARRY F. MANBECK, JR.

*Attesting Officer*     *Commissioner of Patents and Trademarks*